US010452788B2

(12) United States Patent
Schmidt et al.

(10) Patent No.: US 10,452,788 B2
(45) Date of Patent: Oct. 22, 2019

(54) MODELING A THREE-DIMENSIONAL OBJECT HAVING MULTIPLE MATERIALS

(71) Applicant: AUTODESK, INC., San Rafael, CA (US)

(72) Inventors: Ryan Michael Schmidt, Toronto (CA); Tyson Brochu, Vancouver (CA)

(73) Assignee: AUTODESK, INC., San Rafael, CA (US)

( * ) Notice: Subject to any disclaimer, the term of this patent is extended or adjusted under 35 U.S.C. 154(b) by 460 days.

(21) Appl. No.: 14/841,627

(22) Filed: Aug. 31, 2015

(65) Prior Publication Data

US 2017/0061036 A1 Mar. 2, 2017

(51) Int. Cl.
*G06F 17/50* (2006.01)

(52) U.S. Cl.
CPC .................................. *G06F 17/50* (2013.01)

(58) Field of Classification Search
CPC ...................................................... G06F 17/50
USPC ........................................................... 700/98
See application file for complete search history.

(56) References Cited

U.S. PATENT DOCUMENTS

2010/0215856 A1* 8/2010 Kritchman ............ B33Y 10/00 427/277
2011/0087350 A1* 4/2011 Fogel ..................... G06F 17/50 700/98
2014/0228997 A1* 8/2014 Phillips .................. G06F 17/50 700/182
2016/0019319 A1* 1/2016 Shtilerman ............ G06T 17/10 264/308
2016/0096318 A1* 4/2016 Bickel ................ B29C 67/0051 264/40.1

OTHER PUBLICATIONS

Azevedo, et al., "Preserving Geometry and Topology for Fluid Flows with Thin Obstacles and Narrow Gaps", SIGGRAPH '16 Technical Paper, Jul. 24-28, 2016, pp. 12 pages.
Batty, "A cell-centred finite vol. method for the Poisson problem on non-graded quadtrees with second order accurate gradients", Journal of Computational Physics, Nov. 25, 2016, 33 pages.
Batty, et al., "A Fast Variational Framework for Accurate Solid-Fluid Coupling", Eurographics/ ACM SIGGRAPH Symposium on Computer Animation, 2008, 7 pages.

(Continued)

*Primary Examiner* — Robert A Cassity
(74) *Attorney, Agent, or Firm* — Artegis Law Group, LLP

(57) ABSTRACT

A single model engine for receiving and processing a 3D surface model representing the surface of a 3D object, the 3D surface model comprising at least two distinct surface regions associated with at least two different materials. The single model engine automatically produce a set of interior sheets inside the 3D surface model, the set of interior sheets defining interior boundaries and interior volumes of the different materials for the 3D object. The single model engine combines the 3D surface model with the set of interior sheets to produce a single unified model that represents the surface and interior volumes of the 3D object that comprise a single solid object having at least two different materials. At print time, the single model engine performs an export technique to produce an exportable form of the single unified model that can be received and printed by a 3D printer.

23 Claims, 19 Drawing Sheets

(56) References Cited

OTHER PUBLICATIONS

Batty, et al., "A Simple Finite Volume Method for Adaptive Viscous Liquids", Eurographics/ ACM SIGGRAPH Symposium on Computer Animation, 2011, 7 pages.
Batty, et al., "Accurate Viscous Free Surfaces for Buckling, Coiling, and Rotating Liquids", ACM SIGGRAPH/Eurographics Symposium on Computer Animation 2008, 10 pages.
Batty, et al., "Discrete Viscous Sheets", ACM SIGGRAPH 2012, Transactions on Graphics, 31(4), 2012, 7 pages.
Batty, "Simulating Viscous Incompressible Fluids with Embedded Boundary Finite Difference Methods", PhD Thesis, University of British Columbia, Sep. 2010, 255 pages.
Batty, et al., "Tetrahedral Embedded Boundary Methods for Accurate and Flexible Adaptive Fluids", Eurographics 2010, vol. 29, No. 2, 10 pages.
Batty, et al., "Visual Simulation of Wispy Smoke", ACM SIGGRAPH Sketches, 2005, 1 page.
Bridson, et al., "Computational Physics in Film", Science 330, 1756, 2010, 3 pages.
Brochu, et al., "Matching Fluid Simulation Elements to Surface Geometry and Topology", ACM SIGGRAPH 2010 Transactions on Graphics, 29(4), 2010, 9 pages.
Da, et al., "Double Bubbles Sans Toil and Trouble: Discrete Circulation-Preserving Vortex Sheets for Soap Films and Foams", ACM SIGGRAPH 2015, Transactions on Graphics, 34(4), 9 pages.
Da, et al., "Multimaterial Mesh-Based Surface Tracking", ACM SIGGRAPH 2014, Transactions on Graphics, 33(4), 11 pages.
Da, et al., "Surface-Only Liquids", SIGGRAPH '16 Technical Paper, Jul. 24-28, 2016, 12 pages.
Goldade, et al., "A Practical Method for High-Resolution Embedded Liquid Surfaces", Computer Graphics Forum 2016, The Eurographics Association and John Wiley & Sons Ltd., Published by John Wiley & Sons Ltd., 10 pages.
Goswami, et al., "Regional Time Stepping for SPH", Eurographics 2014, 4 pages.
Houston, et al., "Gigantic Deformable Surfaces", ACM SIGGRAPH Sketches, 2005, 1 page.
Houston, et al., "Hierarchical RLE Level Set: A Compact and Versatile Deformable Surface Representation", ACM Transactions on Graphics, 25(1), 2006, 25 pages.
Houston, et al., "RLE Sparse Level Sets", ACM SIGGRAPH Sketches, 2004, 1 page.
Yue, et al., "Continuum Foam: A Material Point Method for Shear-Dependent Flows", ACM Transactions on Graphics, 34(5), 2015 presented at SIGGRAPH Asia 2015, 20 pages.

* cited by examiner

MODELING A THREE-DIMENSIONAL OBJECT HAVING MULTIPLE MATERIALS

BACKGROUND OF THE INVENTION

Field of the Invention

The present invention generally relates to computer graphics and, more specifically, to modeling a three-dimensional object having multiple materials.

Description of the Related Art

A conventional rendering application is typically configured to generate a polygonal mesh that represents the surface of an object within a three-dimensional (3D) environment. A given polygonal mesh could resemble a real-world object, such as a human being, or a virtual object, such as a video game character. For example, in the field of three-dimensional scanning, a rendering application may receive input from a 3D scanner that reflects a scanned real-world object, and the rendering application may then generate a polygonal mesh that represents that real-world object. The rendering application may also be used to produce a polygonal mesh for a virtual object. The polygonal mesh may be a 3D model of the real-world or virtual object.

The designer may wish to designate different regions on the surface of the 3D model to indicate different materials to be used when producing the object (e.g., via a multi-material 3D printer). However, conventional rendering applications only permit a single model to have a single material assigned to the model. When a 3D model indicates different regions having different materials, the 3D model must be divided into multiple sub-models, each sub-model begin produced for each region having a different material. For example, a 3D model of an object that is designed to have two regions of two different materials must be divided into two 3D sub-models, where each 3D sub-model is associated with a different one of the two regions and has a different material.

Designing a 3D model of an object having multiple materials in this manner is non-intuitive and difficult as it requires the designer to conceptualize the object as multiple independent sub-objects and design the 3D model as multiple independent sub-models, rather than a single unified model representing a single solid object having multiple materials. In addition, modifying the sub-models becomes very difficult at the border of two different materials as modifications to one sub-model require the user to manually perform corresponding modifications to the adjacent sub-model. For objects having a relatively large number of regions and different materials, managing and editing the sub-models quickly becomes inefficient and unwieldly.

As the foregoing illustrates, there is a need for a more intuitive and effective technique for modeling an object having multiple regions of different materials.

SUMMARY OF THE INVENTION

One embodiment of the invention includes a computer-implemented method for modeling a three-dimensional (3D) object. The method includes receiving a 3D surface model representing the surface of the 3D object, the 3D surface model comprising at least two distinct surface regions associated with at least two different materials. The method also includes determining a set of interior sheets based on the at least two distinct surface regions, the set of interior sheets defining interior volumes of the at least two different materials within the 3D surface model. The method further includes combining the 3D surface model with the set of interior sheets to produce a single unified model representing the surface and interior volumes of the 3D object.

At least one advantage of the disclosed technique is that a single unified model representing a single solid object having multiple materials may be automatically produced to provide a more intuitive and effective model of the multi-material object.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The following description is divided into three sections. Section I (FIG. 1) describes a computing system for performing (a) a technique for filling holes in a 3D model and (b) a technique for automatically producing a single model for a single object having multiple materials (which implements the technique for filling holes in a 3D model). Section II (FIGS. 2-9) describes the technique for filling holes in a 3D model. Section III (FIGS. 10-16) describes the technique for automatically producing a single 3D model for a single 3D object having multiple materials.

Section I: Computing System

Figure 1:
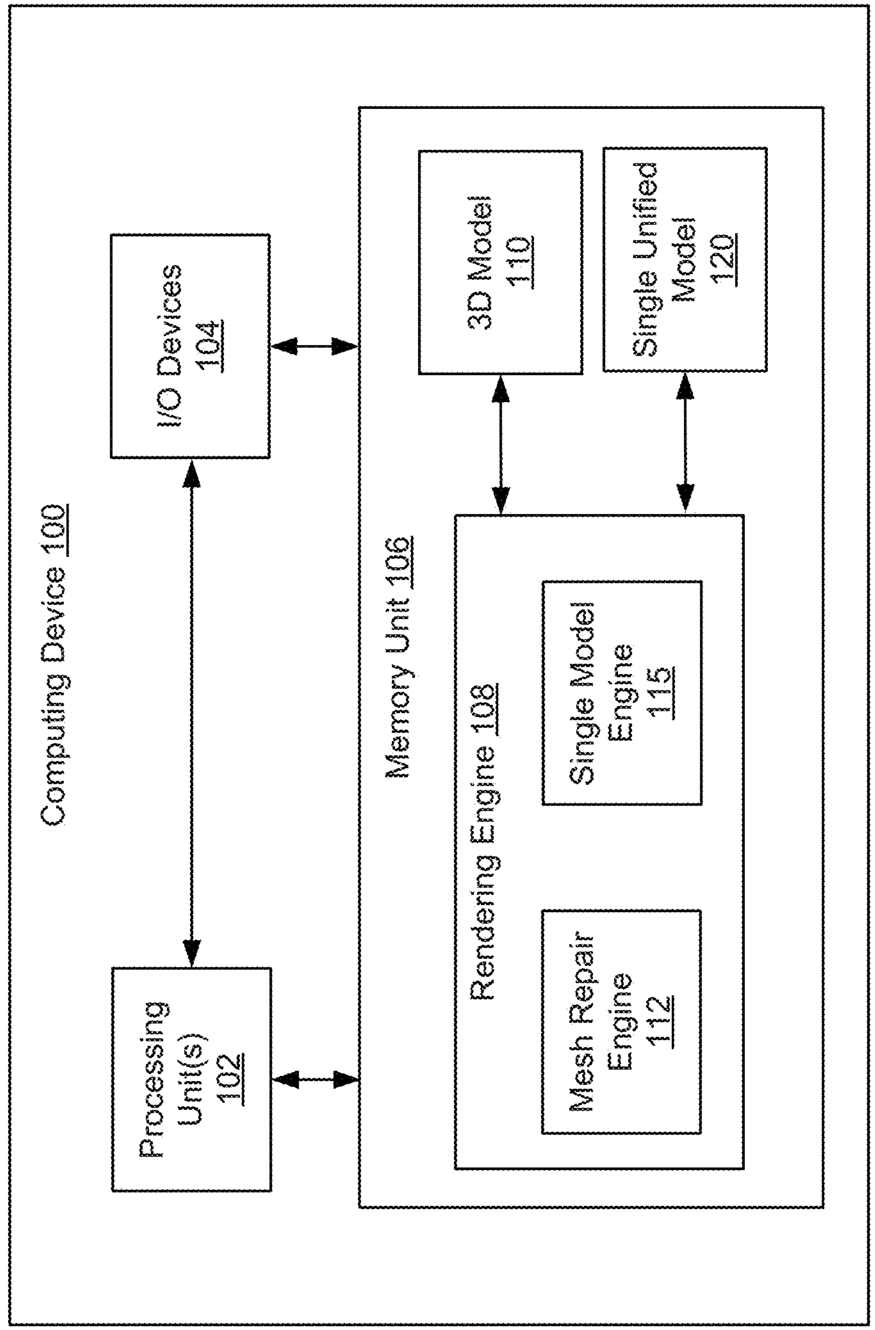
FIG. 1 illustrates a computing device configured to implement one or more aspects of the invention.

FIG. 1 illustrates a computing device 100 configured to implement one or more aspects of the present invention. As shown, computing device 100 includes a processing unit 102 coupled to input/output (I/O) devices 104 and to a memory 106. Processing unit 102 may be a central processing unit (CPU), a graphics processing unit (GPU), or a combination of different processing units, such as a CPU configured to operate in conjunction with a GPU. In general, processing unit 102 may be any technically feasible hardware unit capable of processing data and/or executing software applications.

I/O devices 104 are also coupled to memory 106 and may include devices capable of receiving input, such as a keyboard, a mouse, a video camera, a three-dimensional (3D) scanner, and so forth, as well as devices capable of providing output, such as a display device, a speaker, and so forth. In some embodiments, the I/O devices 104 include a 3D printer, such as a multi-material 3D printer capable of producing physical 3D objects comprising multiple materials. The 3D printer may use a variety of additive manufacturing technologies to create a 3D object by building it in successive layers until the object is complete. Additionally, I/O devices may include devices capable of both receiving input and providing output, such as a touchscreen, a universal serial bus (USB) port, and so forth. I/O devices 104 may be configured to receive various types of input from an end-user of computing device 100, and to also provide various types of output to the end-user of computing device 100.

Memory 106 is configured to store data and may include a hard disk, a random access memory (RAM) module, a flash memory unit, or any other type of memory unit or combination thereof. Processing unit 102 and I/O devices 104 are configured to read data from and write data to memory 106. Memory 106 includes a rendering engine 108, a 3D model 110, and a single unified model 120. The 3D model 110 is a mathematical model of a 3D object, and may include a polygonal mesh, a point cloud, a wireframe model, or a manifold, among other types of mathematical models. In practice, 3D model 110 includes a polygonal mesh composed of triangles. 3D model could represent a real-world object, such as, for example, a human being, or could also represent a virtual object, such as, e.g., a video game character. In one embodiment, 3D model 110 is generated based on data received from a 3D scanner within I/O devices 104 and represents a scanned, real-world object.

Rendering engine 108 is a software application configured to generate and/or modify the 3D model 110. For example, the rendering engine 108 may comprise a CAD-based design software tool. Rendering engine 108 is also configured to render pixels that represent 3D model 110 to a display device included within I/O devices 104. Rendering engine 108 may perform various other operations with 3D model 110, including texture and color mapping, mesh transformation operations, and may also receive user input specifying different modifications to be made to 3D model 110.

Rendering engine 108 includes a mesh repair engine 112 that is configured to repair holes in 3D model 110 by filling those holes with polygons. Rendering engine 108 also includes a single model engine 115 configured to receive and process the 3D model 110 to automatically produce a single unified model 120 representing a single solid object having multiple materials. The mesh repair engine 112 and single model engine 115 may each comprise an add-on module that adds specific features and tools to an existing software application (such as rendering engine 108) to perform embodiments described herein. In other embodiments, mesh repair engine 112 and single model engine 115 may each comprise standalone applications.

Section II: Technique for Filing Holes in a 3D Model

A 3D model 110 may include holes for a variety of reasons. For example, in situations where 3D model 110 is generated by a 3D scanner, regions of 3D model 110 that are not visible to the 3D scanner may not be defined, and may thus appear as holes in 3D model 110. Mesh repair engine 112 is configured to identify such holes and to generate polygons that fill those holes, thereby causing 3D model 110 to appear as a continuous surface.

Figure 2:
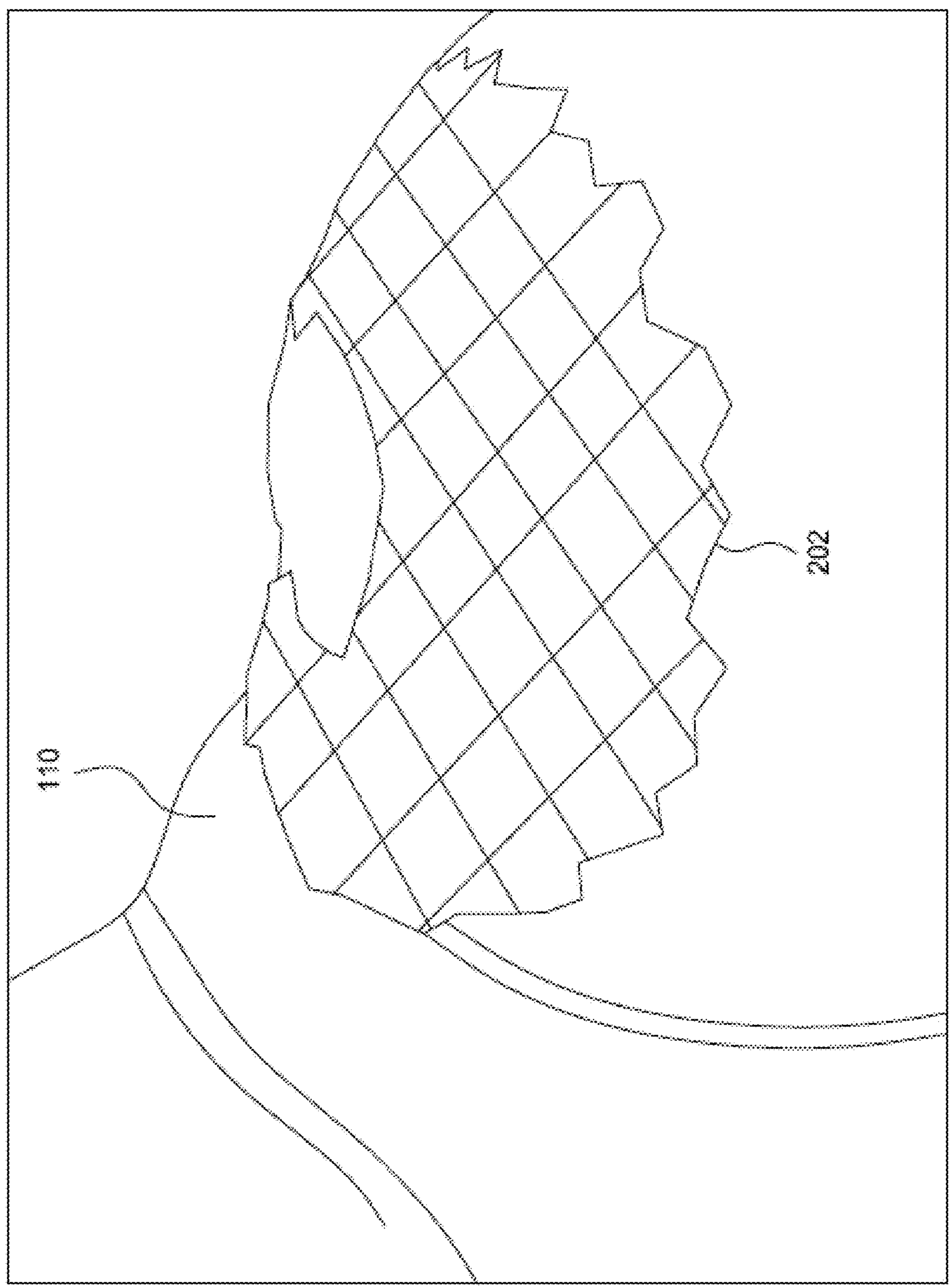
FIG. 2 is a conceptual diagram that illustrates a hole in a polygonal mesh, according to one embodiment of the invention.

FIG. 2 is a conceptual diagram that illustrates a hole 202 in 3D model 110, according to one embodiment of the invention. As shown, 3D model 110 is a semi-continuous surface of polygons that includes a region not defined by any polygons, i.e. hole 202. Hole 202 may be surrounded by a collection of boundary vertices included within 3D model 110 that represent the boundary of hole 202. In practice, 3D model 110 may be a collection of interconnected triangles, such as, e.g., a triangular mesh, and the boundary of hole 202 may be a collection vertices and edges that connect those vertices to one another. Mesh repair engine 112, shown in FIG. 1, is configured to introduce additional edges and/or triangles into 3D model 110 in order to fill hole 202 by performing a multi-step procedure. The first step in that procedure is discussed in greater detail below in conjunction with FIG. 3.

Figure 3:
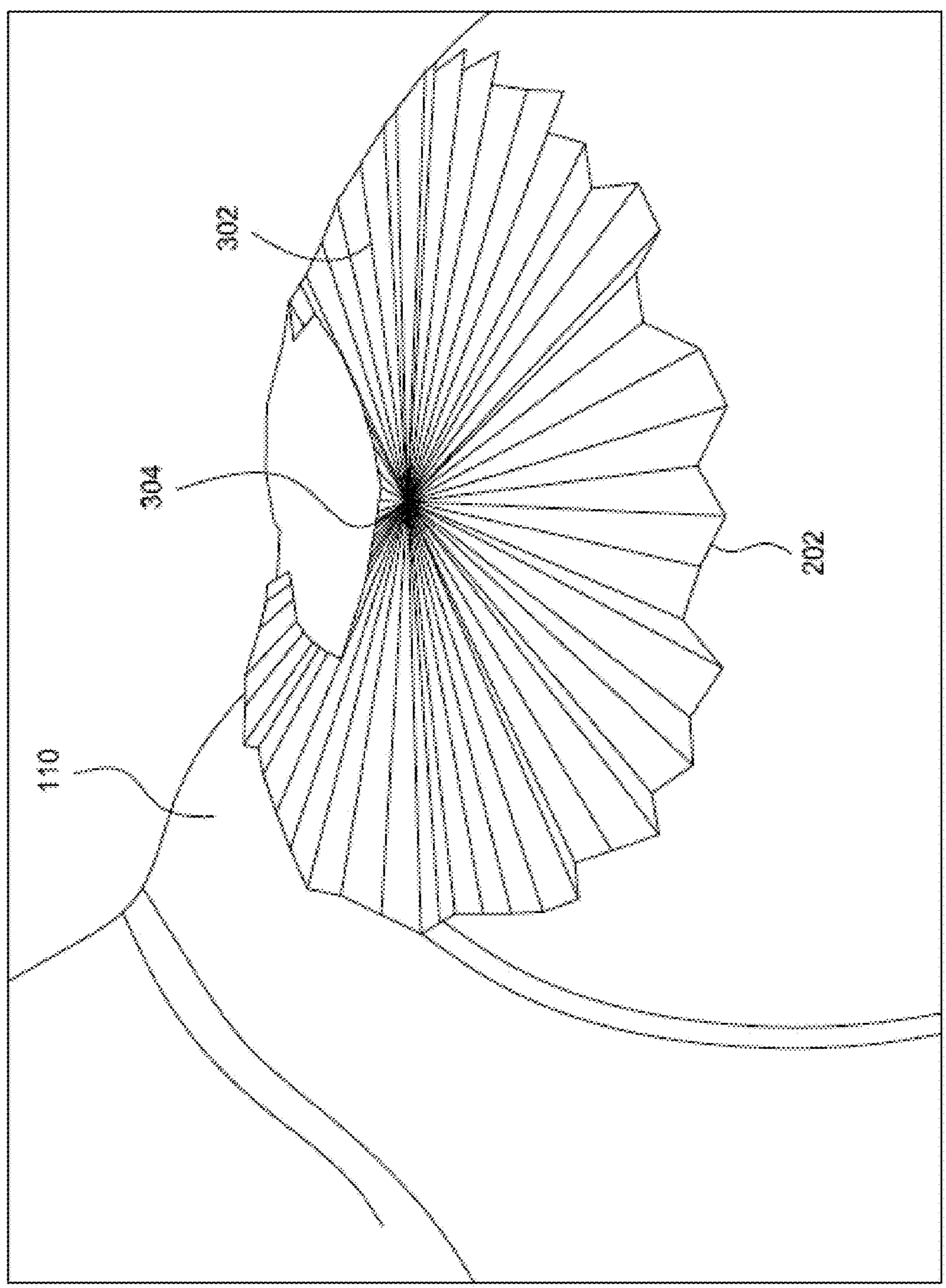
FIG. 3 is a conceptual diagram that illustrates a rough mesh, according to one embodiment of the invention.

FIG. 3 is a conceptual diagram that illustrates a rough mesh 302, according to one embodiment of the invention. As shown, rough mesh 302 is disposed within hole 202 in 3D model 110. Mesh repair engine 112 is configured to generate rough mesh 302 as a first step in the multi-step procedure for repairing holes in 3D model 110, mentioned above in conjunction with FIG. 2. Rough mesh 302 may be any surface that approximately fills hole 202, although in practice, rough mesh 302 is a triangle fan such as that shown in FIG. 3.

Mesh repair engine 112 is configured to generate rough mesh 302 by first approximating the center of hole 202, shown in FIG. 3 as center 304. Mesh repair engine 112 could locate center 304, for example, by computing 3D coordinates sufficiently equidistant from the 3D coordinates of vertices associated with the boundary of hole 202. Mesh repair engine 112 may then generate rough mesh 302 by introducing edges into 3D model 110 that connect center 304 to each of those boundary vertices. In practice, mesh repair engine 112 could implement any technically feasible approach for generating a "rough" mesh that approximately fills hole 202. Mesh repair engine 112 may then refine rough mesh 302, as discussed below in greater detail below in conjunction with FIG. 4.

Figure 4:
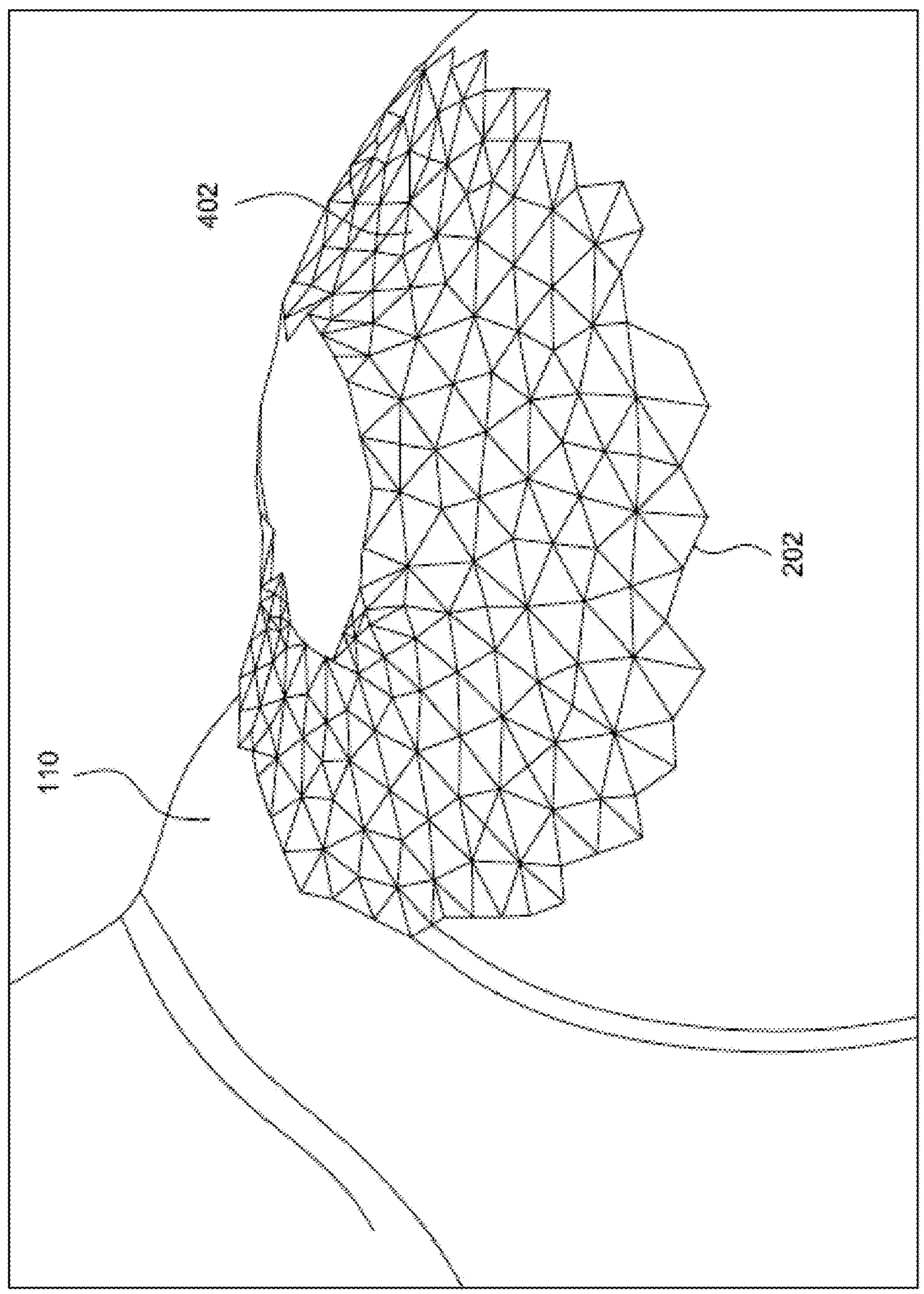
FIG. 4 is a conceptual diagram that illustrates a dynamically refined rough mesh, according to one embodiment of the invention.

FIG. 4 is a conceptual diagram that illustrates a dynamically refined rough mesh 402, according to one embodiment of the invention. As shown, dynamically refined rough mesh 402 is disposed within hole 202 in 3D model 110. Mesh repair engine 112 is configured to generate dynamically refined rough mesh 402 by decomposing each triangle within rough mesh 302 shown in FIG. 3 into a collection of additional, smaller triangles. Mesh repair engine 112 may iteratively refine rough mesh 302 by decomposing a given triangle into several smaller triangles, and then decomposing those smaller triangles into even smaller triangles.

Mesh repair engine 112 may perform this refinement process iteratively until each of the triangles within dynamically refined rough mesh 402 meets certain criteria. In one embodiment, mesh repair engine 112 iteratively refines rough mesh 302 until each triangle within that mesh is approximately equilateral and of similar size to the other triangles within the mesh, thereby generating dynamically refined rough mesh 402. Mesh repair engine 112 then simplifies dynamically refined rough mesh 402 by causing that mesh to be substantially flatter, as discussed below in greater detail below in conjunction with FIG. 5.

Figure 5:
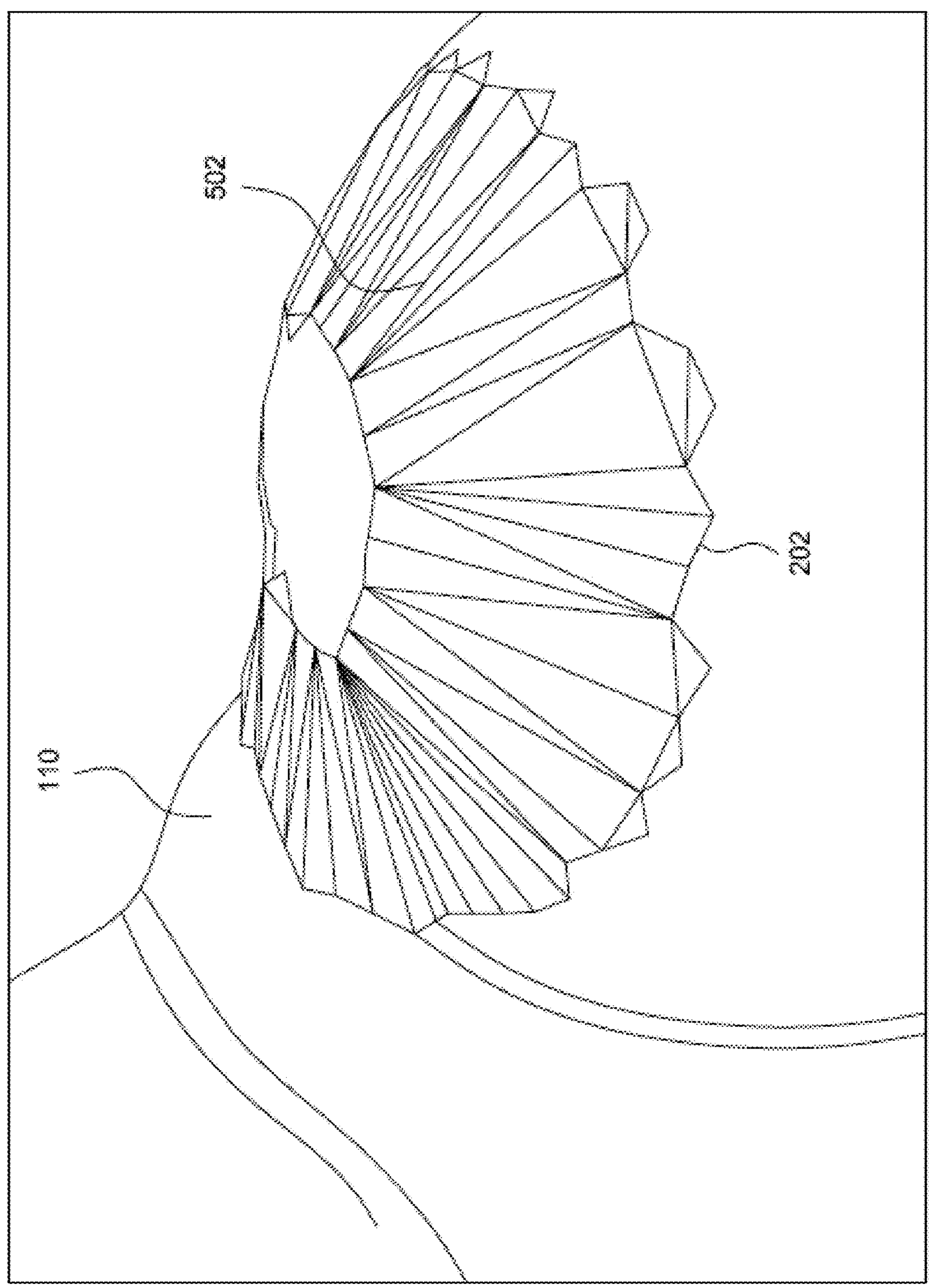
FIG. 5 is a conceptual diagram that illustrates a quasi-developable mesh, according to one embodiment of the invention.

FIG. 5 is a conceptual diagram that illustrates a quasi-developable mesh 502, according to one embodiment of the invention. As shown, quasi-developable mesh 502 is disposed within hole 202 in 3D model 110. Mesh repair engine 112 is configured to generate quasi-developable mesh 502 by collapsing triangles of dynamically refined rough mesh 402 shown in FIG. 4 into larger triangles. In doing so, mesh repair engine 112 may perform edge-collapse operations with edges of dynamically refined rough mesh 402 and/or edge-flip operations with those edges. Mesh repair engine 112 may also alternate between performing edge-collapse operations and edge-flip operations.

In one embodiment, mesh repair engine 112 may only perform a given edge-flip operation when performing such an operation results in a "flatter" mesh. For example, mesh repair engine 112 could identify two triangles that share an edge, and flip one of those triangles only when doing so causes the face normals of the two triangles to have a smaller angle relative to one another. By performing the edge-collapse and edge-flip operations in the fashion described above, mesh repair engine 112 may transform dynamically refined rough mesh 402 shown in FIG. 4 into quasi-developable mesh 502 shown in FIG. 5.

In practice, quasi-developable mesh 502 shown in FIG. 5 may approximate a developable surface. Mesh repair engine 112 could also implement any other technically feasible approach for transforming dynamically refined rough mesh 402 into a developable or a quasi-developable surface such as that shown in FIG. 5. Mesh repair engine 112 may then refine quasi-developable mesh 502, as discussed below in greater detail below in conjunction with FIG. 6.

Figure 6:
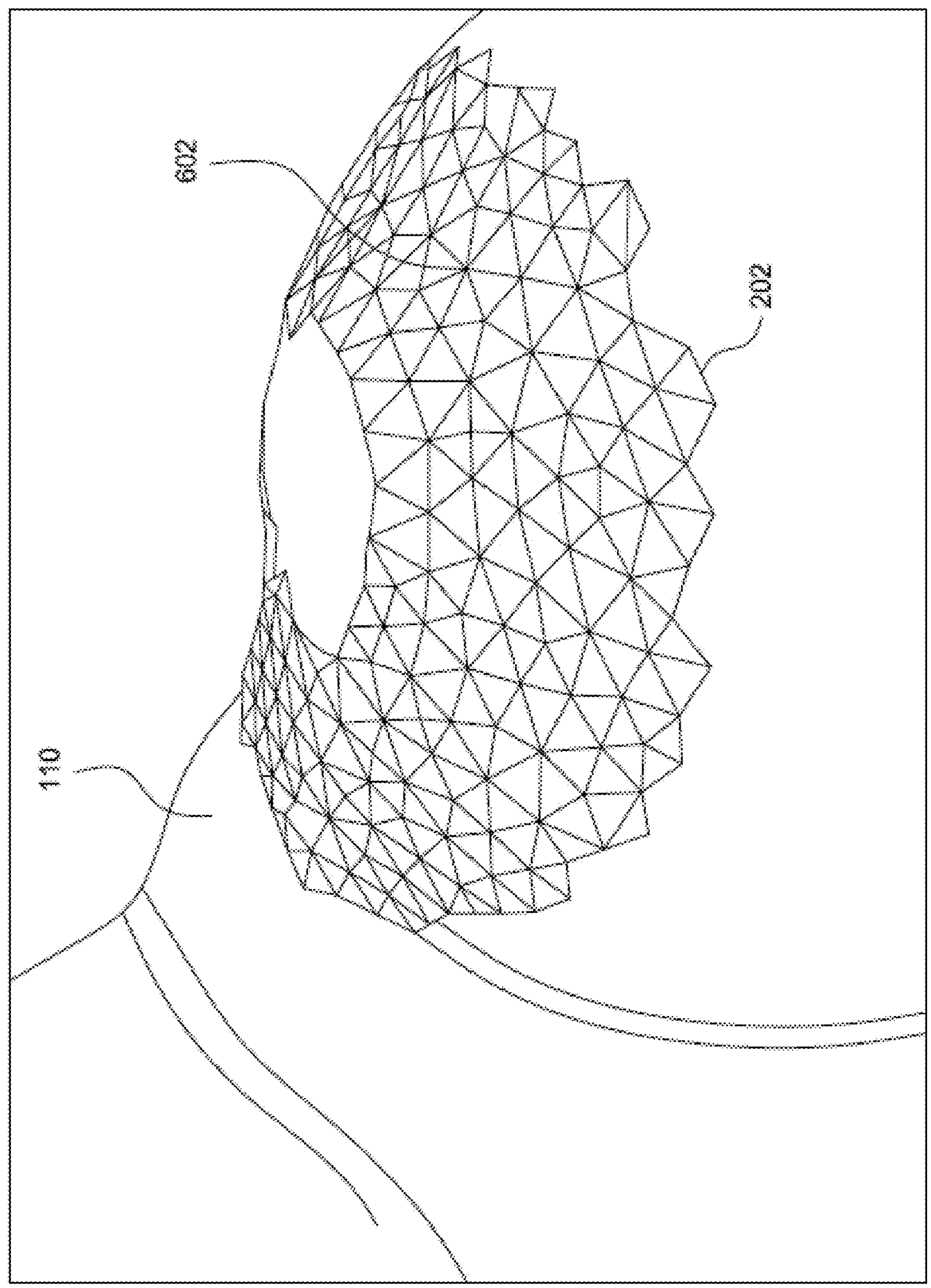
FIG. 6 is a conceptual diagram that illustrates a dynamically refined quasi-developable mesh, according to one embodiment of the invention.

FIG. 6 is a conceptual diagram that illustrates a dynamically refined quasi-developable mesh 602, according to one embodiment of the invention. As shown, quasi-developable mesh 602 is disposed within hole 202 in 3D model 110. Mesh repair engine 112 is configured to generate dynamically refined quasi-developable mesh 602 by refining quasi-developable mesh 502 shown in FIG. 5. In practice, mesh repair engine 112 may implement a similar mesh refinement process as that described above in conjunction with FIG. 4 in order to generate dynamically refined quasi-developable mesh 602.

Specifically, mesh repair engine 112 is configured to decompose each triangle within quasi-developable mesh 502 shown in FIG. 5 into a collection of additional, smaller triangles. Mesh repair engine 112 may also be configured to decompose a given triangle of quasi-developable mesh 502 into several smaller triangles, and then decompose those smaller triangles into even smaller triangles. Mesh repair engine 112 may perform this refinement process iteratively until each of the triangles within dynamically refined quasi-developable mesh 602 meets certain criteria, again, in similar fashion as described above in conjunction with FIG. 4. Mesh repair engine 112 then parameterizes dynamically refined quasi-developable mesh 602, as described in greater detail below in conjunction with FIG. 7.

Figure 7:
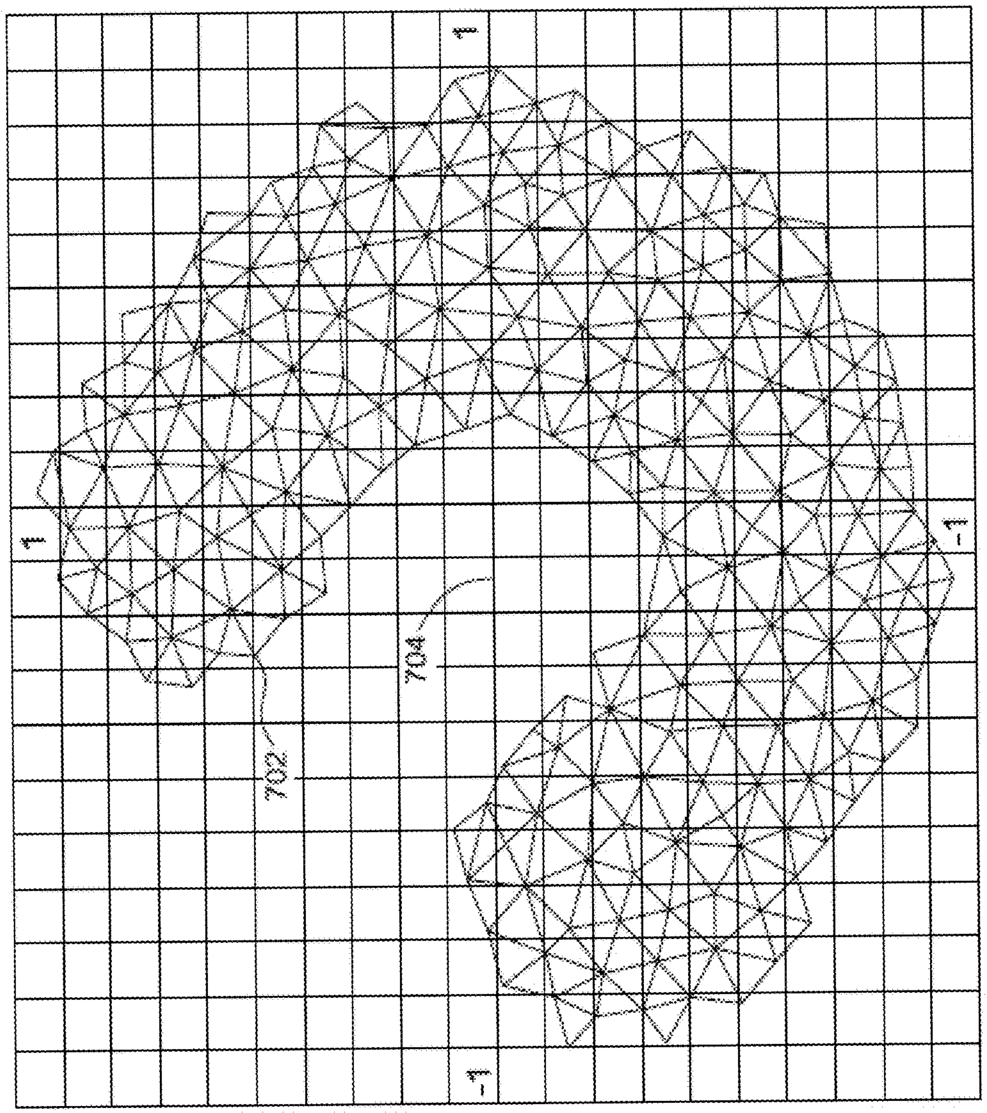
FIG. 7 is a conceptual diagram that illustrates a flattened two-dimensional (2D) mesh, according to one embodiment of the invention.

FIG. 7 is a conceptual diagram that illustrates a flattened two-dimensional (2D) mesh 702, according to one embodiment of the invention. As shown, flattened 2D mesh 702 is disposed on a set of perpendicular axes 704. Mesh repair engine 112 is configured to generate flattened 2D mesh 702 by computing a planar parameterization of dynamically refined quasi-developable mesh 602 shown in FIG. 6 using a conformal map. In general, mesh repair engine 112 generates flattened 2D mesh 702 so that flattened 2D mesh 702 locally approximates the 3D surface of dynamically refined quasi-developable mesh 602. Mesh repair engine 112 then deforms flattened 2D mesh 702 into a 3D mesh that smoothly fills hole 202, as discussed in greater detail below in conjunction with FIG. 8A.

Figure 8A:
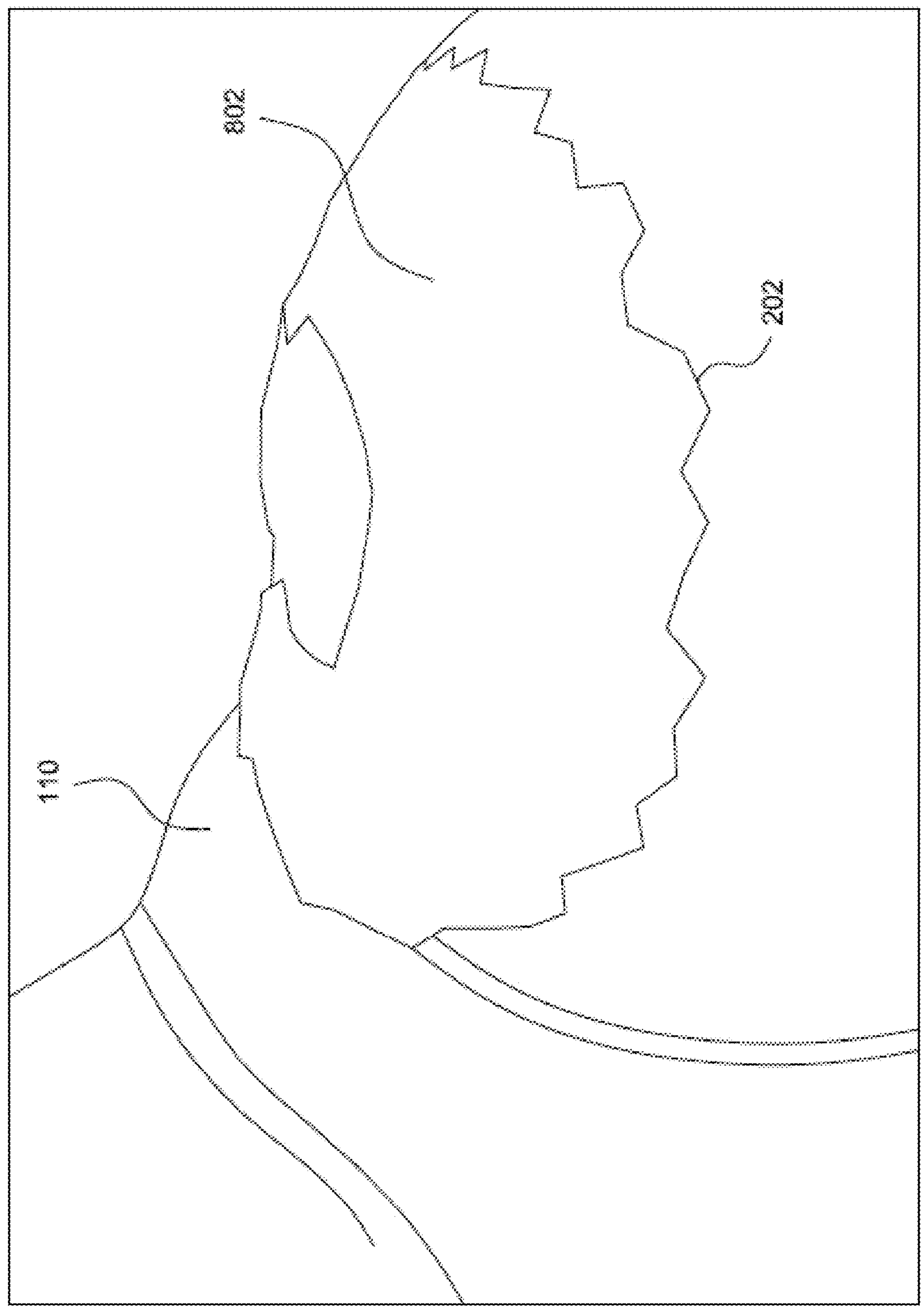
FIGS. 8A-8D are different conceptual diagrams illustrating a three-dimensional (3D) mesh, according to one embodiment of the invention.

FIG. 8A is a conceptual diagram that illustrates a 3D mesh 802, according to one embodiment of the invention. As shown, 3D mesh 802 is disposed within hole 202 in 3D model 110. Mesh repair engine 112 generates 3D mesh 802 by deforming flattened 2D mesh 702 shown in FIG. 7 into three dimensions. In doing so, mesh repair engine 112 places each boundary vertex of flattened 2D mesh 702 at a 3D position that approximately coincides with a boundary vertex of hole 202. Mesh repair engine 112 then projects each interior vertex of flattened 2D mesh 702 into three dimensions by implementing a "mean-value coordinates" approach, as discussed below.

For a given interior vertex of flattened 2D mesh 702, mesh repair engine 112 generates an estimated 3D position of the interior vertex relative to each different boundary vertex. For a given estimate, mesh repair engine 112 also computes a weight value for that estimate based on the spatial relationship between the given interior vertex and the boundary vertex associated with the estimate. Mesh repair engine 112 then computes a weighted average of the various different estimates to provide a 3D position for the interior vertex. In this fashion, mesh repair engine 112 computes a 3D position for each vertex of flattened 2D mesh 702, thereby generating 3D mesh 802.

Figure 8B:
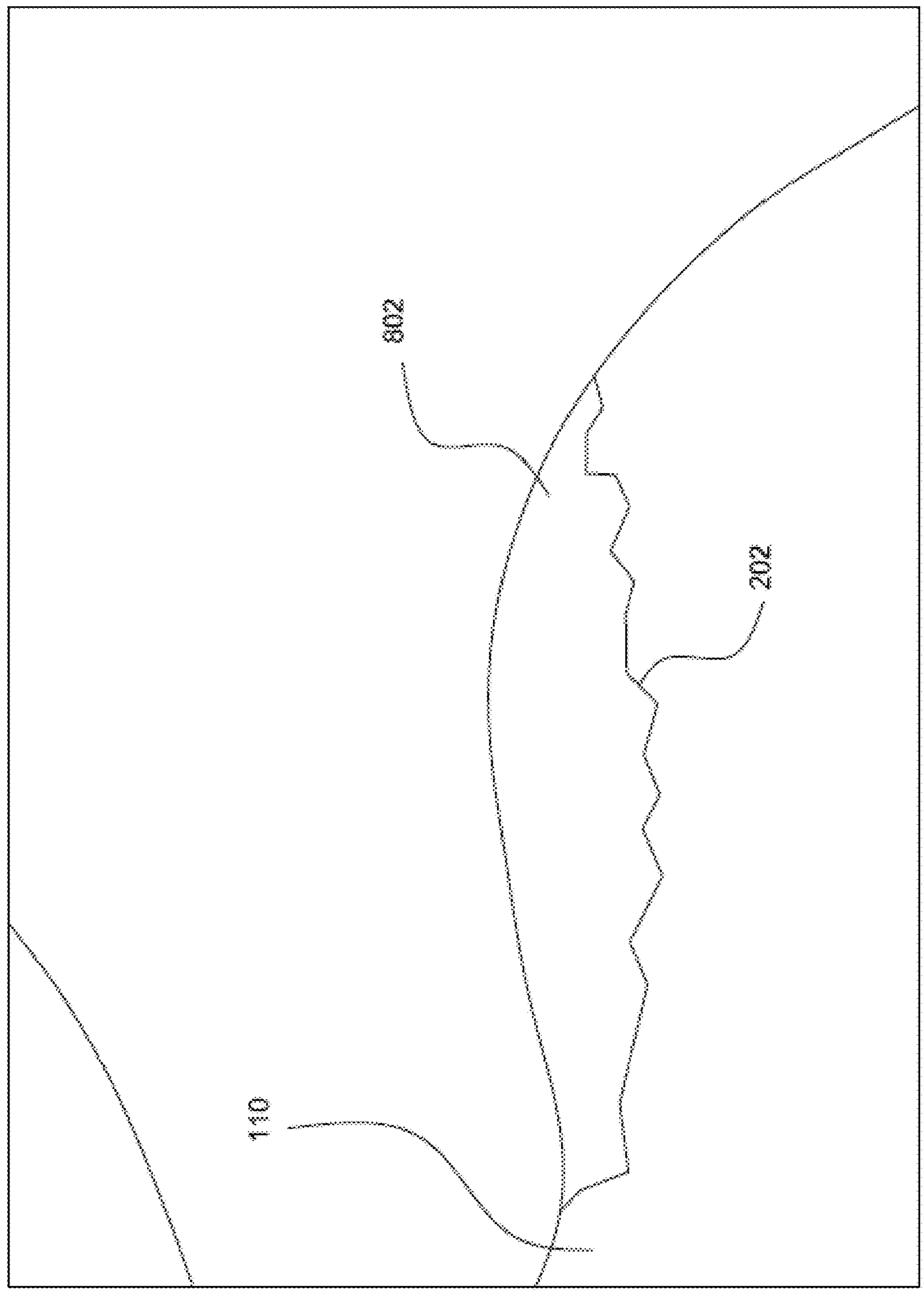

FIG. 8B illustrates a profile view of 3D mesh 802. As shown, 3D mesh 802 smoothly fills hole 202 in 3D model 110. Mesh repair engine 112 is configured to modify flattened 2D mesh 702 discussed above prior to deforming that mesh into three dimensions in order to generate 3D meshes having a variety of different shapes and/or profiles, as discussed in greater detail below in conjunction with FIGS. 8C-8D.

Figure 8C:
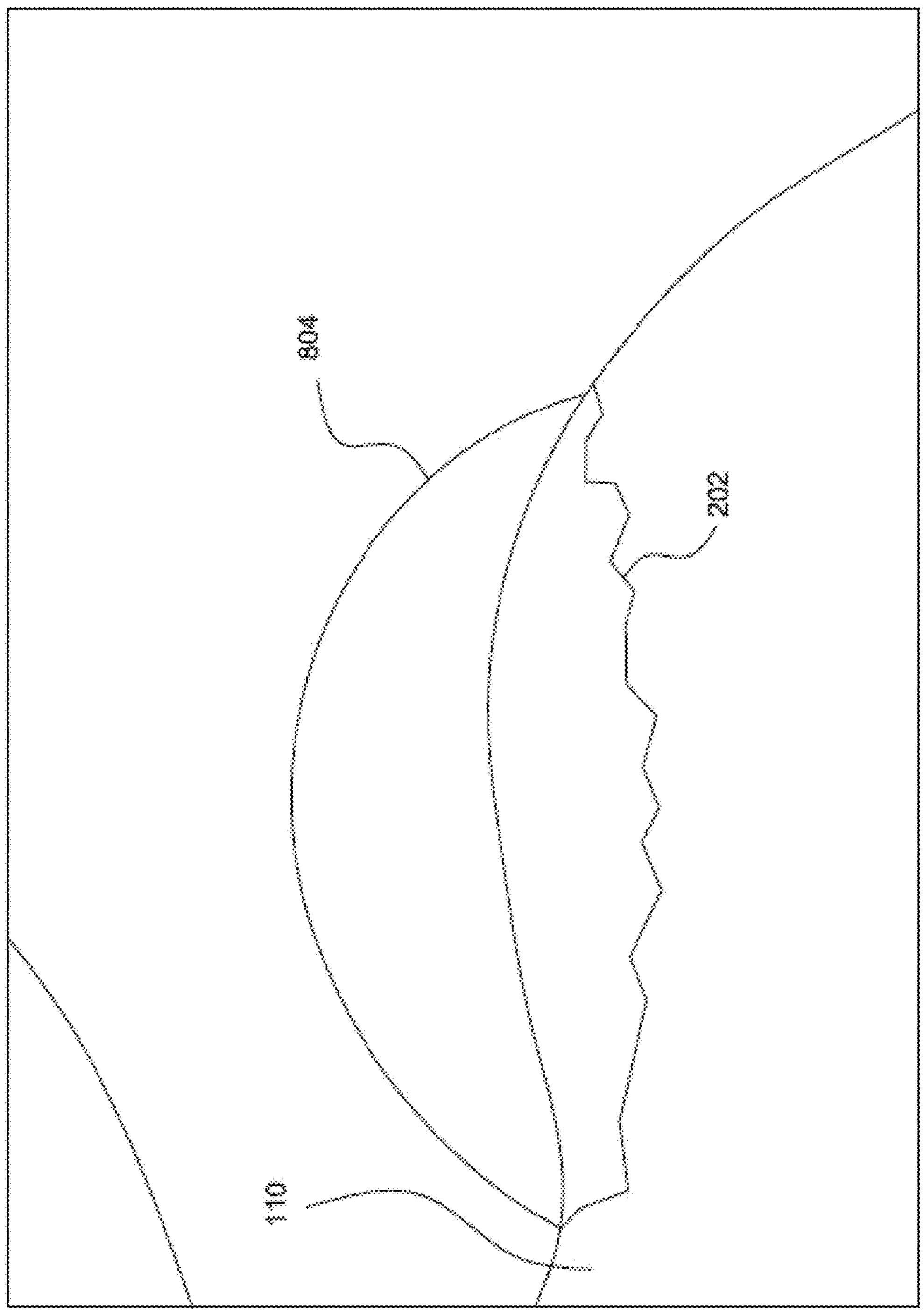

FIG. 8C is a conceptual diagram that illustrates a 3D mesh 804. As shown, 3D mesh 804 is disposed within hole 202 of 3D model 110. Mesh repair engine 112 is configured to generate 3D mesh 804 by scaling flattened 2D mesh 702 shown in FIG. 7, and then deforming that scaled mesh into three dimensions. For example, mesh repair engine 112 could increase the lengths of certain edges within flattened 2D mesh 702, thereby causing that mesh to have a larger area. Mesh repair engine 110 could then deform the scaled, flattened 2D mesh into three dimensions using the technique described above in conjunction with FIG. 8A. However, since the scaled, flattened 2D mesh has a larger area, the resultant 3D mesh 804 would assume a different shape and profile compared to 3D mesh 802.

Mesh repair engine 112 is configured to scale flattened 2D mesh using a variety of different techniques, and may increase or decrease any of the edges within flattened 2D mesh 702 prior to deforming that mesh into three dimensions. Mesh repair engine 112 may also modify 3D mesh 802 directly in order to generate additional 3D meshes having different shapes, as discussed in greater detail below in conjunction with FIG. 8D.

Figure 8D:
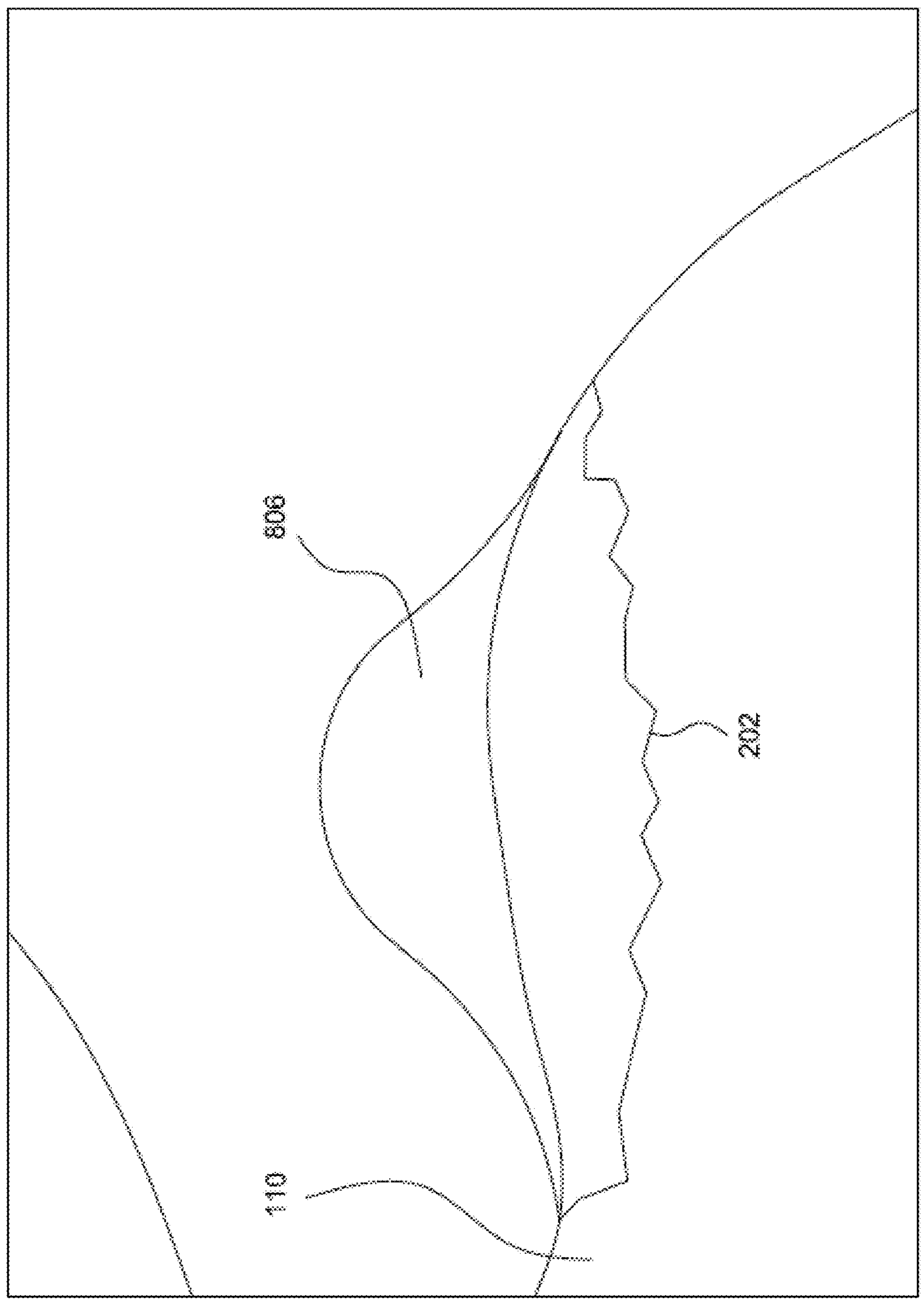

FIG. 8D is a conceptual diagram that illustrates a 3D mesh 806. As shown, 3D mesh 806 is disposed within hole 202 of 3D model 110. Mesh repair engine 112 is configured to generate 3D mesh 806 based on 3D mesh 802 by rotating tangent-normal frames associated with the boundary vertices of 3D mesh 802, thereby causing 3D mesh 802 to "bulge" outwards and assume the shape of 3D mesh 806 shown in FIG. 8D.

In one embodiment of the invention, at each boundary vertex V_i a 3D axis X is defined which is parallel to a 3D line from a previous vertex V_i−1 to a subsequent vertex V_i+1. For a given bulge angle A, a standard axis-angle rotation matrix M is defined which specifies a rotation around axis X by the bulge angle A. A set of vectors associated with a tangent-normal frame at V_i are then transformed via multiplication with this rotation matrix M. Modified tangent-normal frames generated in this fashion are implemented in the deformation technique (also discussed below relative to step 914 in FIG. 9) to control how the interior vertex positions are mapped into 3D space. By altering angle A, the end-user can control the rotation of the initial frames inwards towards the hole center, or outwards away from the hole center, and hence cause the hole-filling surface to "bulge" inwards or outwards.

Mesh repair engine 112 is configured to expose a variety of controls to an end-user of mesh repair engine 112, including controls allowing the end-user to scale the 3D mesh as described above in conjunction with FIG. 8C and controls allowing the end-user to cause 3D mesh 802 to "bulge" into 3D mesh 806. Mesh repair engine 112 may also allow an end-user to interactively modify these parameters of a 3D mesh in real-time.

The multi-step procedure implemented by mesh repair engine 112 described above in conjunction with FIGS. 2-8D is also discussed below in conjunction with FIG. 9.

Figure 9:
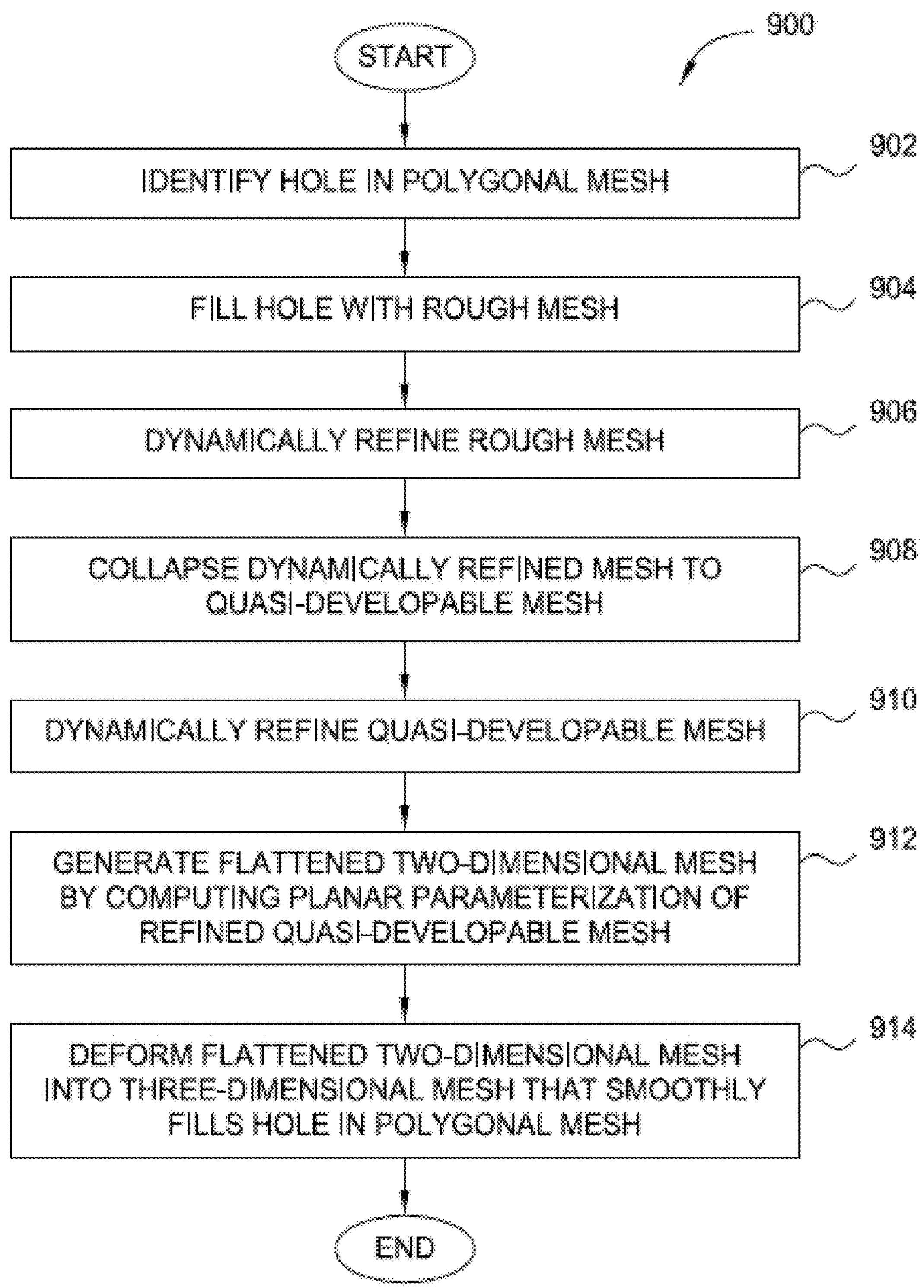
FIG. 9 is a flow diagram of method steps for generating a 3D mesh to fill a hole in a 3D model, according to one embodiment of the invention.

FIG. 9 is a flow diagram of method steps for generating a 3D mesh to fill a hole in a 3D model, according to one embodiment of the invention. Although the method steps are described in conjunction with the system of FIGS. 1-8D, persons skilled in the art will understand that any system configured to perform the method steps, in any order, is within the scope of the present invention.

As shown, a method 900 begins at step 902, where mesh repair engine 112 identifies a hole in a 3D model. The hole could be, e.g., hole 202 in 3D model 110 discussed above in conjunction with FIGS. 2-8D. In general, the 3D model is a mesh of polygons that represents the surface of a 3D object, such as, e.g., a human being. The hole in the 3D model may be a region of the 3D model that is not defined by any polygons.

At step 904, mesh repair engine 112 fills the hole with a rough mesh, in similar fashion as described above in conjunction with FIG. 3. The rough mesh could be, e.g., rough mesh 302 shown in FIG. 3. The rough mesh may be a triangle fan or other type of surface that approximately fills the hole. Mesh repair engine 112 could generate the rough mesh by approximating the center of the hole, and then adding edges that connect the approximate center of the hole to boundary vertices that surround the hole.

At step 906, mesh repair engine 112 dynamically refines the rough mesh to generate a dynamically refined rough mesh, in similar fashion as described above in conjunction with FIG. 4. The dynamically refined rough mesh could be, e.g., dynamically refined rough mesh 402 shown in FIG. 4. Mesh repair engine 112 is configured to generate the dynamically refined rough mesh by decomposing each triangle within the rough mesh into a collection of additional, smaller triangles.

At step 908, mesh repair engine 112 collapses vertices within dynamically refined rough mesh to generate a quasi-developable mesh, in similar fashion as described above in conjunction with FIG. 5. The quasi-developable mesh could be, e.g., quasi-developable mesh 502 shown in FIG. 5. Mesh repair engine 112 is configured to alternate between performing edge-collapse operations and edge-flip operations in order to collapse vertices within the dynamically defined rough mesh. Mesh repair engine 112 may also perform a given edge-flip operation only when performing such an operation results in a "flatter" mesh.

At step 910, mesh repair engine 112 dynamically refines quasi-developable mesh to generate a dynamically refined quasi-developable mesh, in similar fashion as described above in conjunction with FIG. 6. The dynamically refined quasi-developable mesh could be, e.g., dynamically refined quasi-developable mesh 602 shown in FIG. 6. Mesh repair engine 112 may implement a similar mesh refinement process as that described above in step 906 in order to generate the dynamically refined quasi-developable mesh.

At step 912, mesh repair engine 112 generates a flattened 2D mesh by computing a planar parameterization of the dynamically refined quasi-developable mesh, in similar fashion as described above in conjunction with FIG. 7. The flattened 2D mesh could be, e.g., flattened 2D mesh 702 shown in FIG. 7. Mesh repair engine 112 may also implement a conformal map when parameterizing the dynamically refined quasi-developable map into two dimensions.

At step 914, mesh repair engine 112 deforms the flattened 2D mesh into a 3D mesh that smoothly fills the hole identified at step 902, in similar fashion as described above in conjunction with FIGS. 8A-8D. The 3D mesh could be, any of 3D meshes 802, 804, or 806 discussed above in conjunction with FIGS. 8A-8B, 8C, and 8D, respectively. Mesh repair engine 112 may implement a "mean-value coordinate" approach in order to generate 3D coordinates for each vertex of the flattened 2D mesh. Once mesh repair engine 112 generates a 3D mesh that fills the hole identified at step 902, the method 900 ends.

In sum, a mesh repair engine is configured to repair a hole in a 3D model by (i) filling the hole with a rough mesh, (ii) refining the rough mesh, (iii) collapsing the refined mesh, (iv) refining the collapsed mesh, (v) flattening the refined, collapsed mesh, and then (vi) deforming the flattened mesh into a 3D surface that smoothly fills the hole in the 3D model.

Section III: Automatically Producing a Single Model for a Single Object Having Multiple Materials As described above, the 3D model 110 comprises a mathematical model of a 3D object (such as a polygonal mesh composed of triangles, a wireframe model, etc.). The 3D model may represent a real-world or virtual object. In some embodiments, the 3D model 110 represents the surface of a single solid object comprising at least two different materials. In these embodiments, the 3D model 110 comprises at least two distinct surface regions associated with at least two different materials for the 3D object, each surface region being associated with/assigned a particular corresponding material. For example, using the rendering engine 108, the designer may demarcate different regions on the surface of the 3D model 110, for example, using different colors and/or textures, each color and/or texture mapping to a particular type of material to be used when producing the 3D object (e.g., via a multi-material 3D printer). As the different regions are only specified and demarcated on the surface, the 3D model 110 is referred to herein as the 3D surface model.

The single model engine 115 may receive and process the 3D surface model (3D model 110) using a "sheeting" technique to automatically produce a set of interior surfaces ("sheets") within/inside the 3D surface model. In some embodiments, the sheeting technique implements the hole filling technique described in Section II. The set of interior sheets define interior boundaries and interior volumes of the different materials within/inside the 3D surface model. The single model engine 115 then combines the 3D surface model (3D model 110) with the set of interior sheets to produce a single unified model 120. The single unified model 120 represents the surface and interior volumes of a single solid object having at least two different materials. The single unified model 120 is also referred to herein as a non-manifold 3D model. At print time, the single model engine 115 may perform an "export" technique to produce an exportable form of the single unified model 120 that can be received by a 3D printer.

Figure 10:
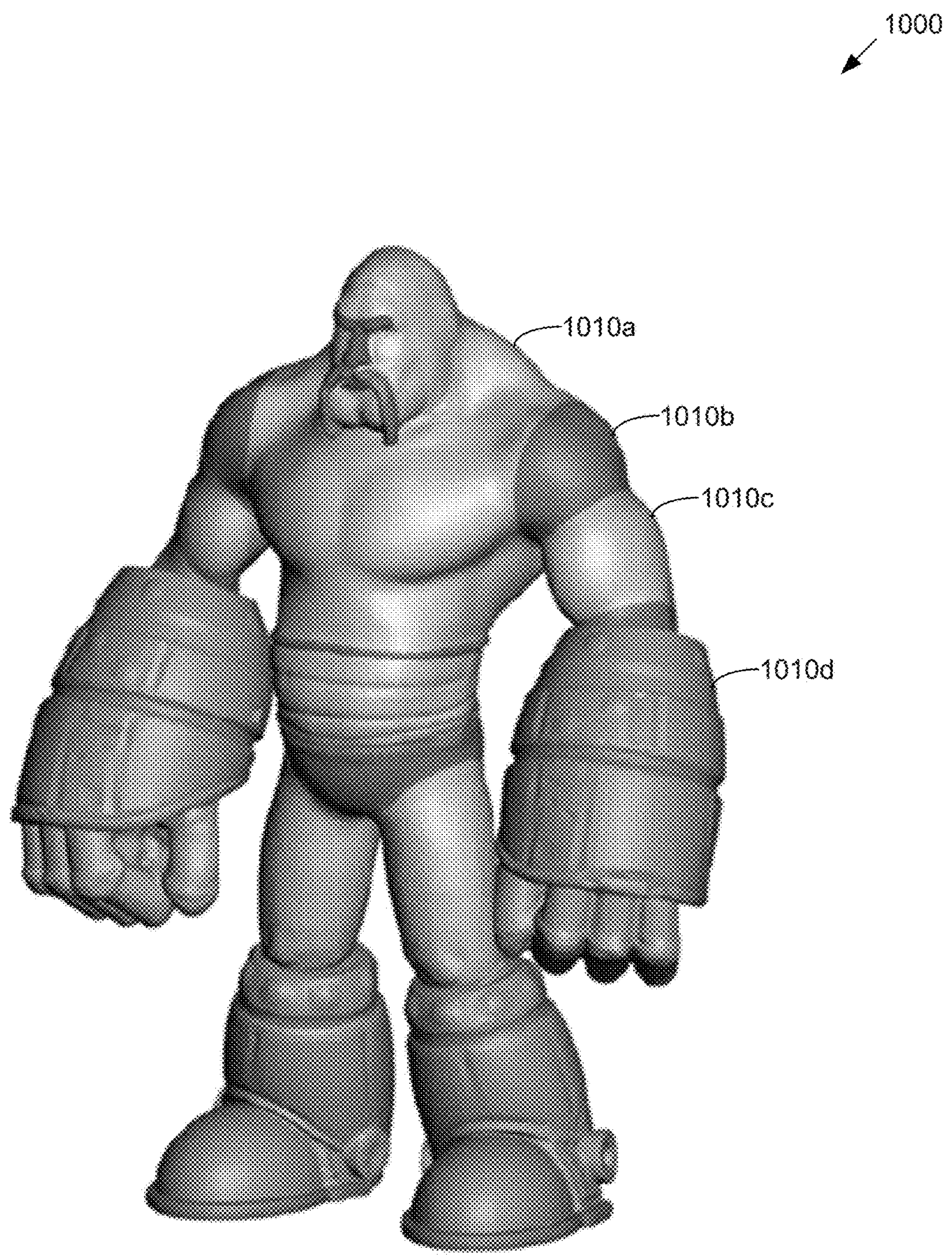
FIG. 10 shows a 3D surface model of a virtual object, according to one embodiment of the invention.

FIG. 10 shows a 3D surface model 1000 of a virtual object, according to one embodiment of the invention. In the example of FIG. 10, the virtual object comprises a figurine of a superhero. The 3D surface model 1000 comprises a 3D model 110 that may be generated by the rendering engine 108 by a designer. As shown in FIG. 10, the 3D surface model 1000 comprises a plurality of discrete/distinct surface regions 1010*a-d* having different color and/or texture mappings, as specified by the designer. A discrete surface region may comprise a contiguous surface area of the 3D surface model. For example, if the 3D surface model comprises a polygonal mesh, a surface region may comprise a contiguous area of the polygonal mesh.

In some embodiments, each particular color and/or texture specified for a discrete surface region maps/corresponds to a particular type of material, as specified by the designer. In other embodiments, the discrete surface regions comprising different materials is demarcated using a different method. The designer may use any type of design tool to demarcate the different types of materials, such as color (painting), texture, or other types of design tools.

Current multi-material printers may mix base resins to produce materials with various properties. Different types of materials may be specified by the designer, for example, to achieve different levels of hardness, flexibility, feel, or other types of characteristics. Types of materials typically used may include, for example, rubber-like material, transparent/translucent material, rigid opaque material, ABS-plastic-like material, heat-resistant material, and simulated polypropylene. In other embodiments, other types of materials may be used.

In other embodiments, other types of materials with other types of characteristics may be specified. For example, in FIG. 10, a torso surface region 1010*a* and upper-arm surface region 1010*c* may be assigned a first material (e.g., medium-hard type of material), a shoulder surface region 1010*b* may be assigned a second material (e.g., more softer flexible type of material), and a bracelet surface region 1010*d* may be assigned a third material (e.g., harder type of material).

Note that the different regions 1010*a-d* comprising different materials are only specified and demarcated on the surface of the 3D model 110. The 3D model 110 is also referred to as a 3D surface model or a manifold 3D model representing the surface of a 3D object. Conventionally, the 3D surface model must be divided into multiple sub-models, each sub-model begin produced for each surface region and material. Thus, the object itself conceptually comprises sub-objects, each sub-object represented by a sub-model. Designing a 3D model of an object having multiple materials in this manner is non-intuitive and difficult.

In some embodiments, the single model engine 115 processes the 3D surface model using to automatically produce a set of interior surfaces ("sheets") that are determined based on (inferred from) the surface regions of the 3D surface model. In some embodiments, the sheeting technique implements the hole filling technique described in Section II (as discussed below). The interior sheets define interior boundaries between different materials within/inside the 3D surface model. The interior sheets also help define the interior volumes for the different materials associated with/corresponding to the different surface regions of the 3D surface model. A contiguous interior volume (composed of a particular material) may be bounded by at least two interior sheets and at least two corresponding surface regions. The interior sheets define interior boundaries and interior volumes for the different materials underneath the corresponding surface regions of the 3D surface model. Thus, the single model engine 115 provides automatic interior volume segmentation of the 3D surface model that is inferred based on the distinct demarcated surface regions of the 3D surface model by automatically creating volumetric information from surface information. In doing so, the single model engine 115 automatically determines, for each distinct surface region, interior boundaries and interior volume for the material associated with/corresponding to the distinct surface region.

Interior sheets may be in the same mathematical form and defined in the same manner as the surface regions of the 3D surface model, and may have the same visual appearance and characteristics as the surface regions of the 3D surface model. For example, if the surface regions of 3D surface model comprises polygonal meshes (e.g., triangular meshes), the interior sheets will also comprise polygonal meshes. Thus, the interior sheets may comprise surface regions that do not traverse the surface of the 3D surface model, but rather traverse the interior of the 3D surface model.

Figure 11:
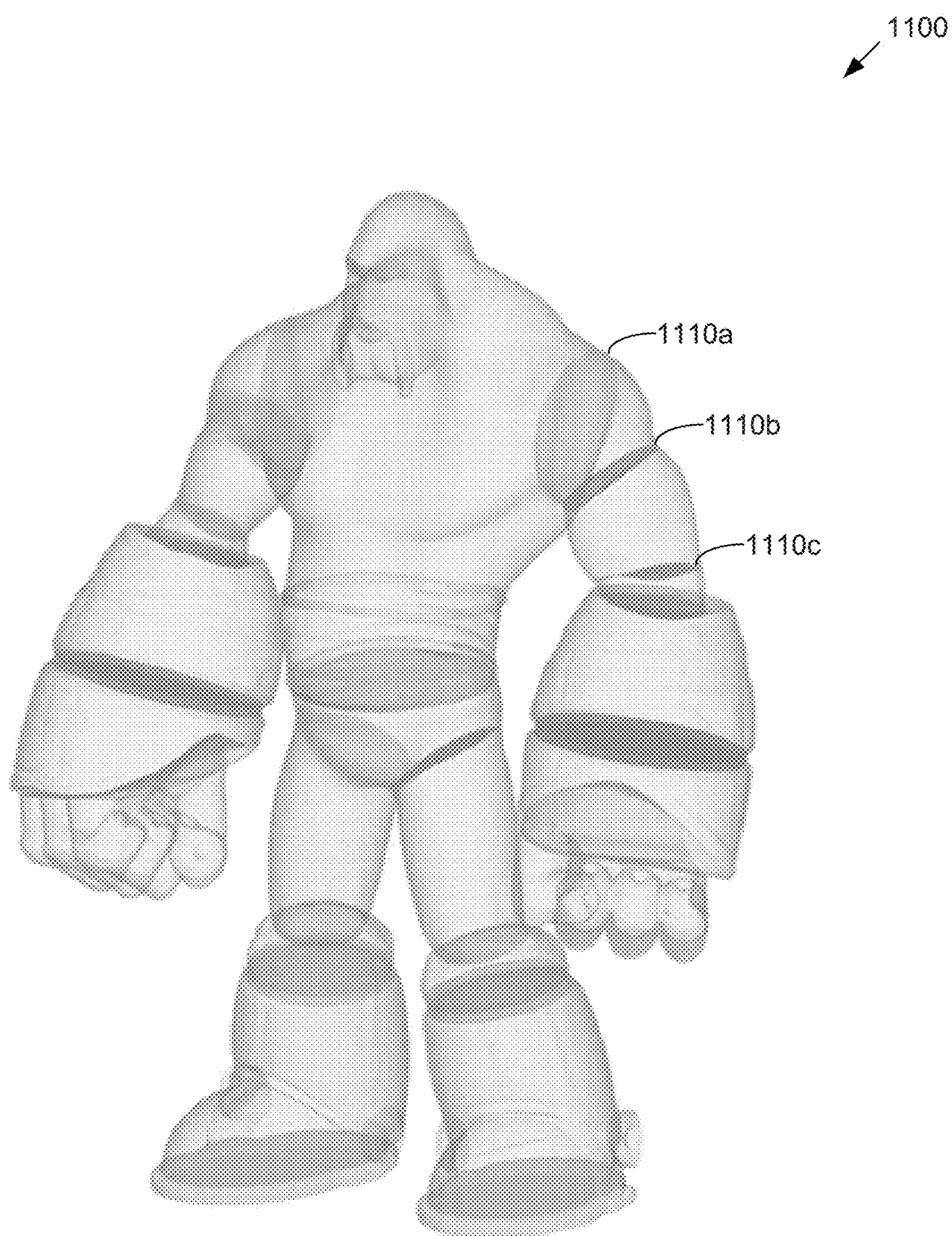
FIG. 11 shows a set of interior sheets produced for the 3D surface model of FIG. 10, according to one embodiment of the invention.

FIG. 11 shows a set of interior sheets produced for the 3D surface model 1000 of FIG. 10, according to one embodiment of the invention. In the example of FIG. 11, the interior sheets 1110*a-c* are shown as dark shaded discs within a semi-transparent rendering 1100 of the 3D surface model 1000. As shown, the interior sheets 1110*a-c* start at the surface of the 3D surface model 1000 and continues into the interior of the 3D surface model 1000. In particular, each interior sheet 1110 starts at the boundary/border of two distinct surface regions of the 3D surface model 1000 and continues underneath the surface and into the interior of the 3D surface model 1000. For example, a first interior sheet 1110*a* starts at the boundary/border of the torso surface region 1010*a* and the shoulder surface region 1010*b* of the 3D surface model 1000 and continues into the interior of the 3D surface model 1000. As another example, a second interior sheet 1110*b* starts at the boundary/border of the shoulder surface region 1010*b* and the upper-arm surface region 1010*c* of the 3D surface model 1000 and continues into the interior of the 3D surface model 1000. In the example of FIG. 11, the interior sheets 1110 intersect completely through 3D surface model 1000 and traverse from a front surface all the way through to a back surface of the 3D surface model 1000. In other embodiments, the interior sheets 1110 intersect through 3D surface model 1000 only to a predefined depth, as specified by the designer.

After all interior sheets are determined, the single model engine 115 then automatically combines the original 3D surface model (3D model 110) with the set of interior sheets to produce a single unified model 120. The single unified model 120 represents the surface and interior volumes of a single solid object having at least two different materials. Each contiguous interior volume of the single unified model 120 is composed of an associated material and is bounded by interior sheets and corresponding surface regions. Thus, at least two interior sheets and at least two surface regions may define a contiguous interior volume for at least one type of material.

In some embodiments, the 3D surface model comprises a manifold 3D model representing the surface regions of a 3D object, whereas the single unified model 120 comprises a non-manifold 3D model representing the surface regions and interior volumes of the 3D object. For example, if the surface regions and the interior sheets comprise polygonal meshes (the interior sheets here being considered surface regions that traverse the interior), the boundary between discrete surface regions may be examined. If there are only two discrete surface regions having polygons that are incident on the boundary, then the 3D model comprises a manifold 3D model. A polygon may be determined to be incident with the boundary if the polygon overlaps, is in contact with, and/or coincides with the boundary. This is the case with the 3D surface model since at any boundary between two discrete surface regions, there are only the two surface regions having polygons incident on the boundary (i.e., there is no interior sheet/surface that is also incident on the boundary). Thus, when there are only two surface regions sharing the same boundary, this indicates a manifold 3D model. If there are three discrete surface regions having polygons that are incident on the boundary, then the 3D model comprises a non-manifold 3D model. This is the case with the single unified model 120 since at any boundary between discrete surface regions, there are three surface regions having polygons incident on the boundary (the two surface regions and the interior sheet/surface that is also incident on the boundary). Thus, when there are three surface regions sharing the same boundary, this indicates a non-manifold 3D model.

At print time, the single model engine 115 may perform an "export" technique to automatically produce and export a printable form of the single unified model 120 that can be received by a 3D printer (e.g., a multi-material 3D printer). The 3D printer processes the printable form of the single unified model 120 and prints the 3D object represented by the single unified model 120. In some embodiments, the final printed 3D object comprise a single solid object having at least two different materials associated with/corresponding to at least two distinct surface regions of the 3D object. The at least two different materials comprise at least two different interior volumes within the 3D object that correspond to the at least two distinct surface regions of the 3D object. The at least two different materials may additionally be printed in at least two different colors and/or textures, as specified by the designer.

Figure 12:
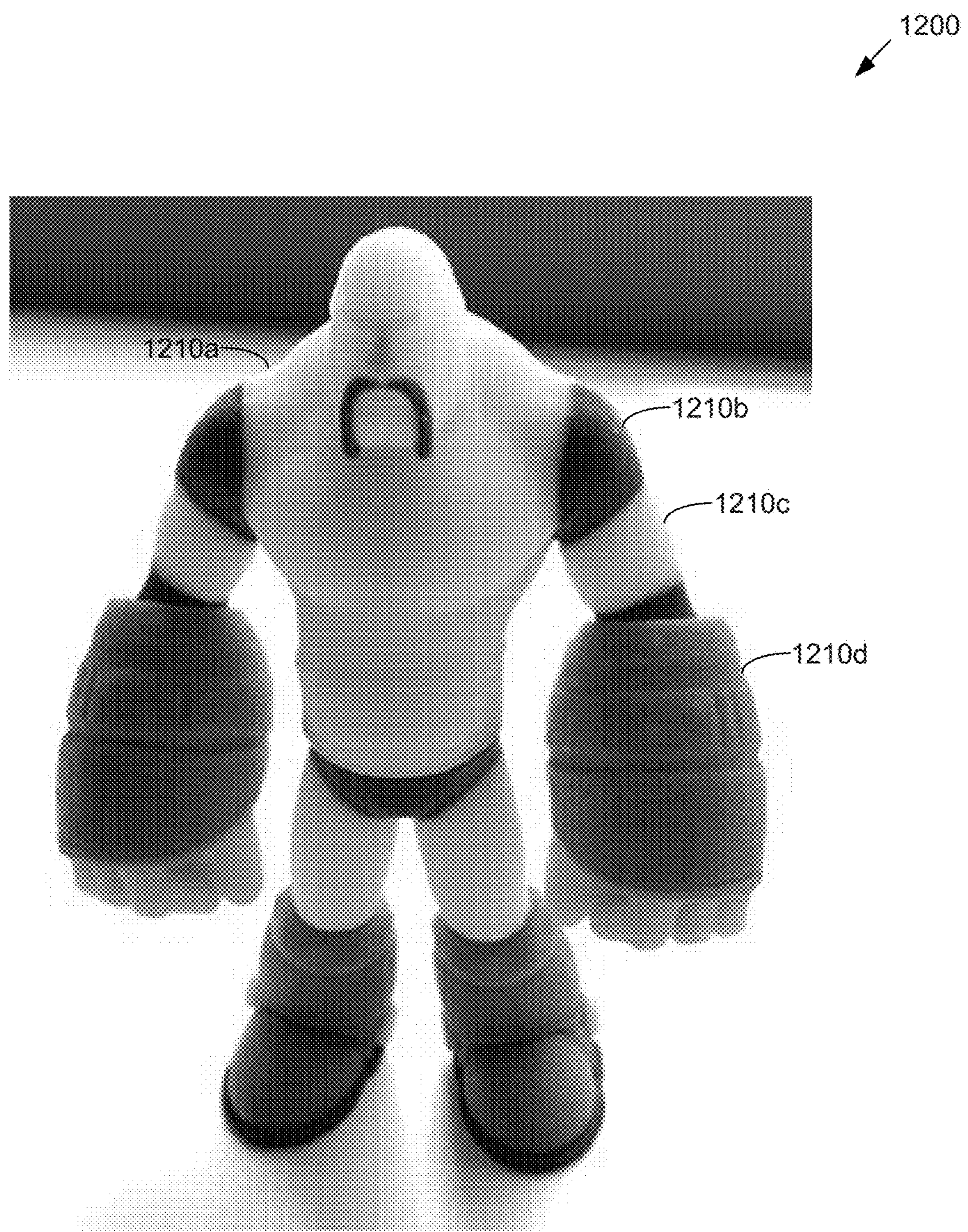
FIG. 12 shows a printed 3D object represented by the interior sheets of FIG. 11 and the 3D surface model of FIG. 10, according to one embodiment of the invention.

FIG. 12 shows a printed 3D object represented by the interior sheets of FIG. 11 and the 3D surface model of FIG. 10, according to one embodiment of the invention. In the example of FIG. 12, the printed 3D object 1200 comprises at least a torso volume 1210*a* and upper-arm volume 1210*c* composed of a first material, a shoulder volume 1210*b* composed of a second material, and a bracelet volume 1210*d* composed of a third material. The different volumes 1210*a-d* of the 3D object 1200 may also be printed in different colors and/or textures, as specified by the designer.

Figure 13:
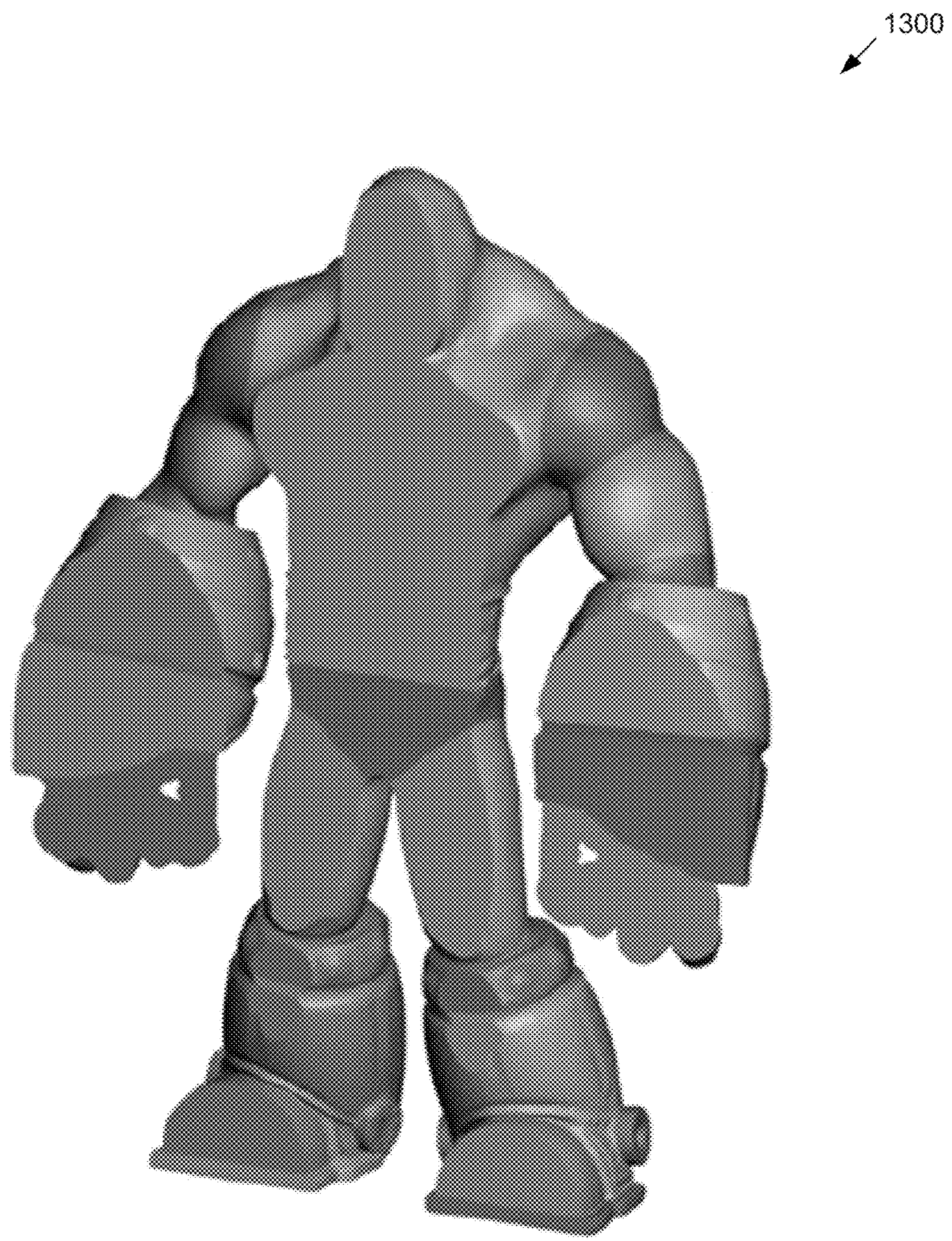
FIG. 13 shows a planar section of the printed 3D object of FIG. 12, according to one embodiment of the invention.

FIG. 13 shows a planar section 1300 of the printed 3D object of FIG. 12, according to one embodiment of the invention. As shown in FIG. 13, a planar section through the assembly of the printed 3D object shows the different materials composes the entirety of the various volumes 1210*a-d* and not just the surface regions of the various volumes 1210*a-d*.

Figure 14:
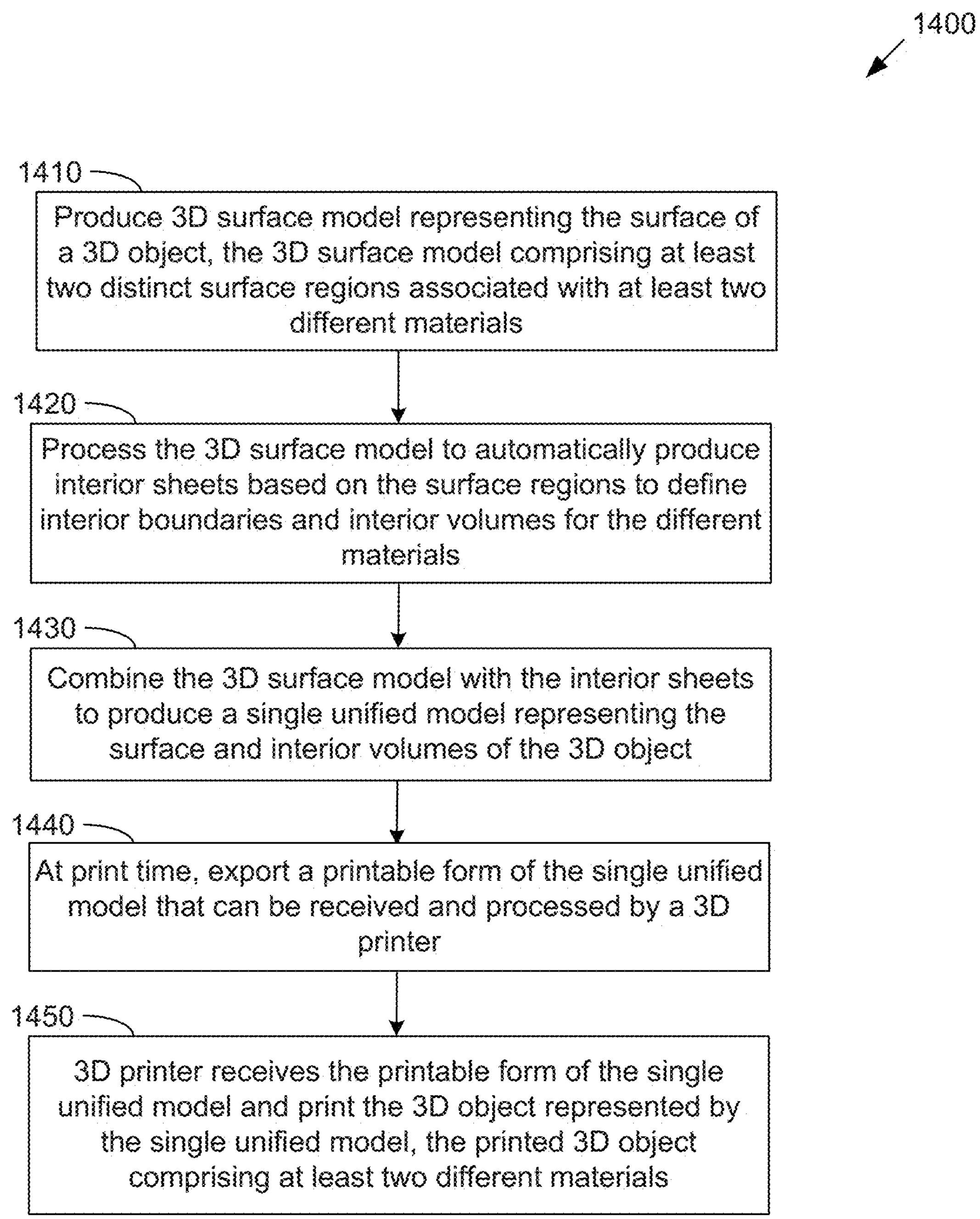
FIG. 14 illustrates a flow diagram of method steps for producing and exporting a single unified model representing a 3D object, according to one embodiment of the invention.

FIG. 14 illustrates a flow diagram of method steps for producing and exporting a single unified model representing a 3D object, according to one embodiment of the invention. Although the method steps are described in conjunction with the systems of FIGS. 1-8D and 10-13, persons skilled in the art will understand that any system configured to perform the method steps, in any order, is within the scope of the invention.

As shown, a method 1400 begins at step 1410, where the rendering engine 108, when executed by processing unit 102, produces a 3D surface model (3D model 110) representing the surface of a real-world or virtual object. The 3D surface model comprises at least two distinct surface regions associated with/corresponding to at least two different materials. For example, using the rendering engine 108, the designer may demarcate different surface regions using different colors and/or textures, each color and/or texture mapping to a particular material.

At step 1420, the single model engine 115, when executed by processing unit 102, receives and processes the 3D surface model using a "sheeting" technique to automatically detect surface region boundaries and produce interior sheets for each detected boundary. The interior sheets define interior boundaries for the different materials for the corresponding surface regions of the 3D surface model. The interior sheets and corresponding surface regions also define contiguous interior volumes for the different materials of the 3D surface model, each contiguous interior volume (composed of a particular material) being bounded by at least two interior sheets and at least two corresponding surface regions. The "sheeting" technique is discussed in relation to FIG. 15.

At step 1430, the single model engine 115 combines the 3D surface model with the interior sheets to produce a single unified model 120. The single unified model 120 represents the surface and interior volumes of the 3D object. At step 1440, at print time, the single unified model 120 performs an "export" technique to automatically produce and export a printable form of the single unified model 120 that can be received and processed by 3D printer software, and then printed by a 3D printer. The "export" technique is discussed in relation to FIG. 16.

At step 1450, a 3D printer receives the printable form of the single unified model 120 to print the 3D object represented by the single unified model 120. The printed 3D object comprises a solid object comprising at least two different materials. The method 1400 then ends.

Figure 15:
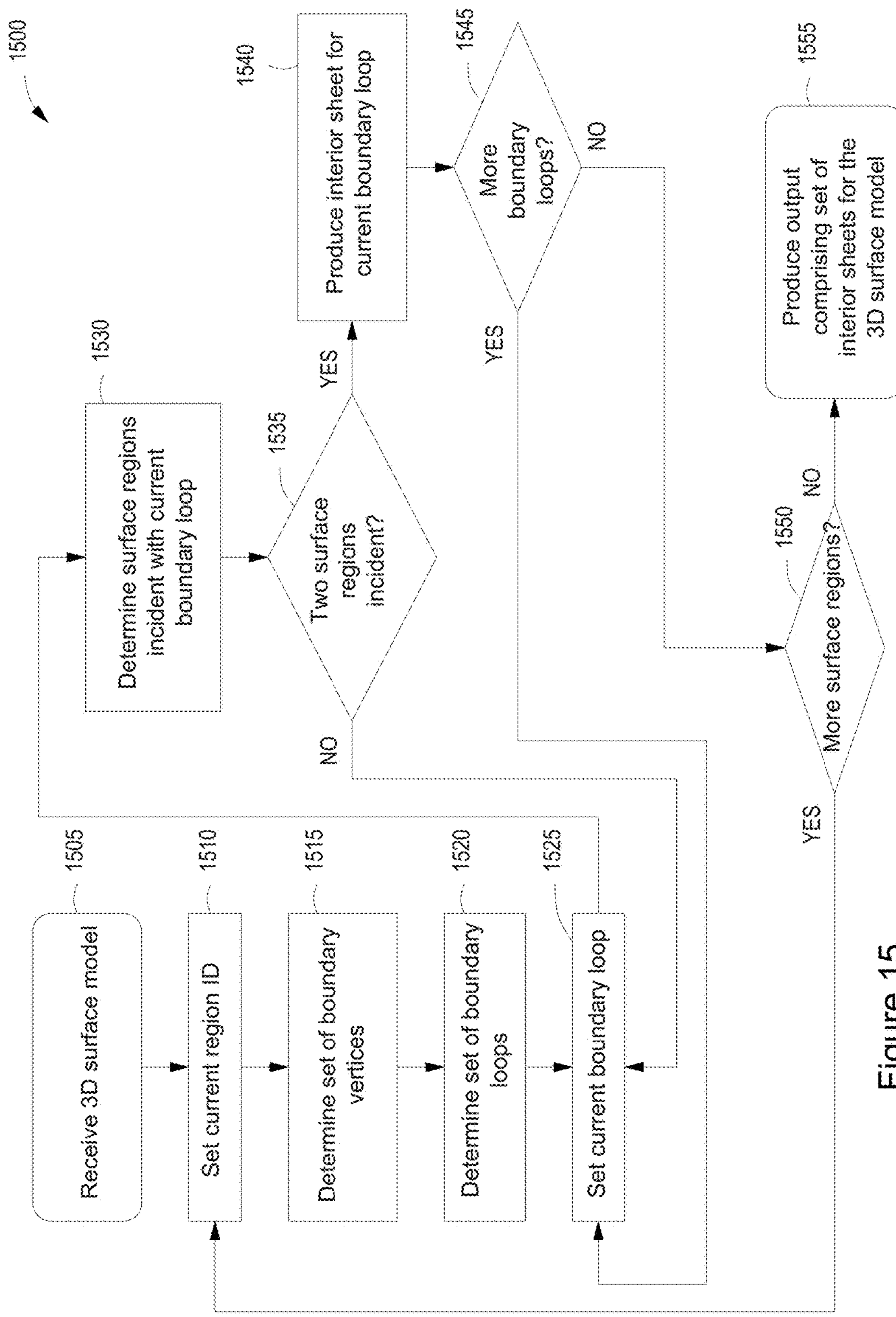
FIG. 15 illustrates a flow diagram of method steps for automatically producing interior sheets for a 3D surface model, according to one embodiment of the invention.

FIG. 15 illustrates a flow diagram of method steps for automatically producing interior sheets for a 3D surface model, according to one embodiment of the invention. Although the method steps are described in conjunction with the systems of FIGS. 1-8D and 10-13, persons skilled in the art will understand that any system configured to perform the method steps, in any order, is within the scope of the present invention.

As shown, a method 1500 begins at step 1505, where the single model engine 115, when executed by processing unit 102, receives a 3D surface model (3D model 110) representing the surface of a 3D object. The 3D surface model comprises at least two distinct surface regions associated with at least two different materials. In the method 1500 described in FIG. 15, the 3D surface model comprises a polygonal mesh, such as a triangular mesh, having a plurality of polygons having a plurality of vertices. Each distinct surface region may comprise a contiguous area of polygons defined by a plurality of vertices and edges that connect the vertices. In other embodiments, a different type of 3D surface model may be used. At step 1505, the single model engine 115 also assigns a unique region identifier (ID) to each distinct surface region of the 3D surface model. At step 1510, the single model engine 115 sets a current region surface (having a current region ID) for processing. Through multiple iterations, the method 1500 processes all region surfaces of the 3D surface model.

At step 1515, the single model engine 115 determines a set of boundary vertices that represent and define (along with the edges that connect the vertices) the entire boundary of the current surface region having the current region ID. Various methods known in the art may be used to determine the set of boundary vertices. For example, the single model engine 115 may examine, for every edge (e) in the current surface region, if there is only one incident polygon/triangle (incident with the edge) having the current region ID, the edge is added to a set of boundary edges. For every edge in the set of boundary edges, the two vertices of the edge may be added to the set of boundary vertices.

At step 1520, the single model engine 115 determines a set of one or more boundary loops from the set of boundary vertices for the current surface region. Each boundary loop may comprise is a closed loop that runs along/traverses a portion of the entire boundary of the current surface region. Each boundary loop is defined by a set of vertices and the edges that connect the vertices. A boundary loop may potentially comprise a boundary of an interior sheet to be generated.

At step 1520, various methods known in the art may be used to determine the set of boundary loops from the set of boundary vertices (S) for the current surface region. For example, the single model engine 115 may perform the below pseudo-code:

```
Retrieve and remove vertex (v_i) from S
Create an empty ordered list (L) of vertices
Add v_i to L
While S is not empty:
Find all edges in the mesh that are incident to v_i
For each incident edge: (v_i, v_j):
    If v_j is in S:
    Add v_j to L
    Remove v_j from S
    Let v_i = v_j
```

A boundary loop may comprise a cyclically ordered list of boundary vertices. Thus, for vertex v(i) and v(i+1) in the boundary loop, there exists an edge in the polygonal mesh connecting v(i) and v(i+1). If there are N vertices in the boundary loop, then v(N−1) and v(0) may also be connected by an edge in the polygonal mesh. The pseudocode provided below for determining the set of boundary loops may comprise a method for ordering the boundary vertices in such a way, given an unordered set of boundary vertices. Given such an ordering of the boundary vertices, storing the list of edges may be unnecessary, since adjacency in the boundary loop may indicate the existence of an edge.

At step 1525, the single model engine 115 sets a current boundary loop in the set of boundary loops for processing. Through multiple iterations, the method 1500 processes all boundary loop in the set of boundary loops.

At step 1530, the single model engine 115 determines all surface regions in the 3D surface model that are incident with any part of the current boundary loop. For example, the single model engine 115 may determine a surface region is incident with the current boundary loop if the surface region has any polygons that are incident on any part of the current boundary loop. A polygon may be determined to be incident with the current boundary loop if the polygon overlaps, is in contact with, and/or coincides with the current boundary loop.

At step 1535, the single model engine 115 determines whether there are two distinct surface regions incident on any part of the current boundary loop. If not, the method 1500 continues at step 1525 where the single model engine 115 sets a next current boundary loop in the set of boundary loops for processing. If yes, this indicates that the current boundary loop separates two distinct surface regions associated with two different materials and an interior sheet needs to be inferred for the current boundary loop. Therefore, if the single model engine 115 determines that there are two distinct surface regions incident on the current boundary loop, the method 1500 continues at step 1540 where an interior sheet is produced for the current boundary loop.

At step 1540, the single model engine 115 implements the hole filling technique described in Section II to produce an interior sheet for the current boundary loop. For example, the single model engine 115 may send instructions to the mesh repair engine 112 produce an interior sheet for the current boundary loop. The mesh repair engine 112 may then perform the method 900 of FIG. 9 for generating a 3D mesh (the interior sheet) that fills a hole in a 3D model (the 3D surface model). For example, at step 902 of the method 900, the mesh repair engine 112 may identify the current boundary loop as a hole to be filled in the 3D surface model. Thus the hole may be defined as the current boundary loop for purposes of the method 900. Similar to a hole in a 3D model, a boundary loop is defined by a set of vertices and the edges that connect the vertices and also comprises a region of the 3D model that is not defined by any polygons (since the current boundary loop only defines an outer boundary shape for the interior sheet). The mesh repair engine 112 may perform the method 900 of FIG. 9 to generate a 3D mesh that fills the current boundary loop with polygons, the resulting 3D mesh comprising the interior sheet for the current boundary loop. Thus, the mesh repair engine 112 will produce an interior sheet having a boundary that comprises the current boundary loop.

At step 1545, the single model engine 115 determines whether there are more boundary loops to be processed in the set of boundary loops identified for the current surface region (at step 1520). If yes, the method 1500 continues at step 1525 where the single model engine 115 sets a next current boundary loop in the set of boundary loops for processing. If not, the method 1500 continues at step 1550.

At step 1550, the single model engine 115 determines whether there are more distinct surface regions of the 3D surface model to be processed. If yes, the method 1500 continues at step 1510 where the single model engine 115 sets a next current region surface (having a current region ID) for processing. If not, the method 1500 continues at step 1555. At step 1555, the single model engine 115 produces an output comprising a set of interior sheets produced (at step 1540) for the 3D surface model. The method 1500 then ends.

As described in relation to FIG. 14, the single model engine 115 may then combine (at step 1430) the 3D surface model with the set of interior sheets to produce a single unified model 120 that represents the surface and interior volumes of the 3D object.

Figure 16:
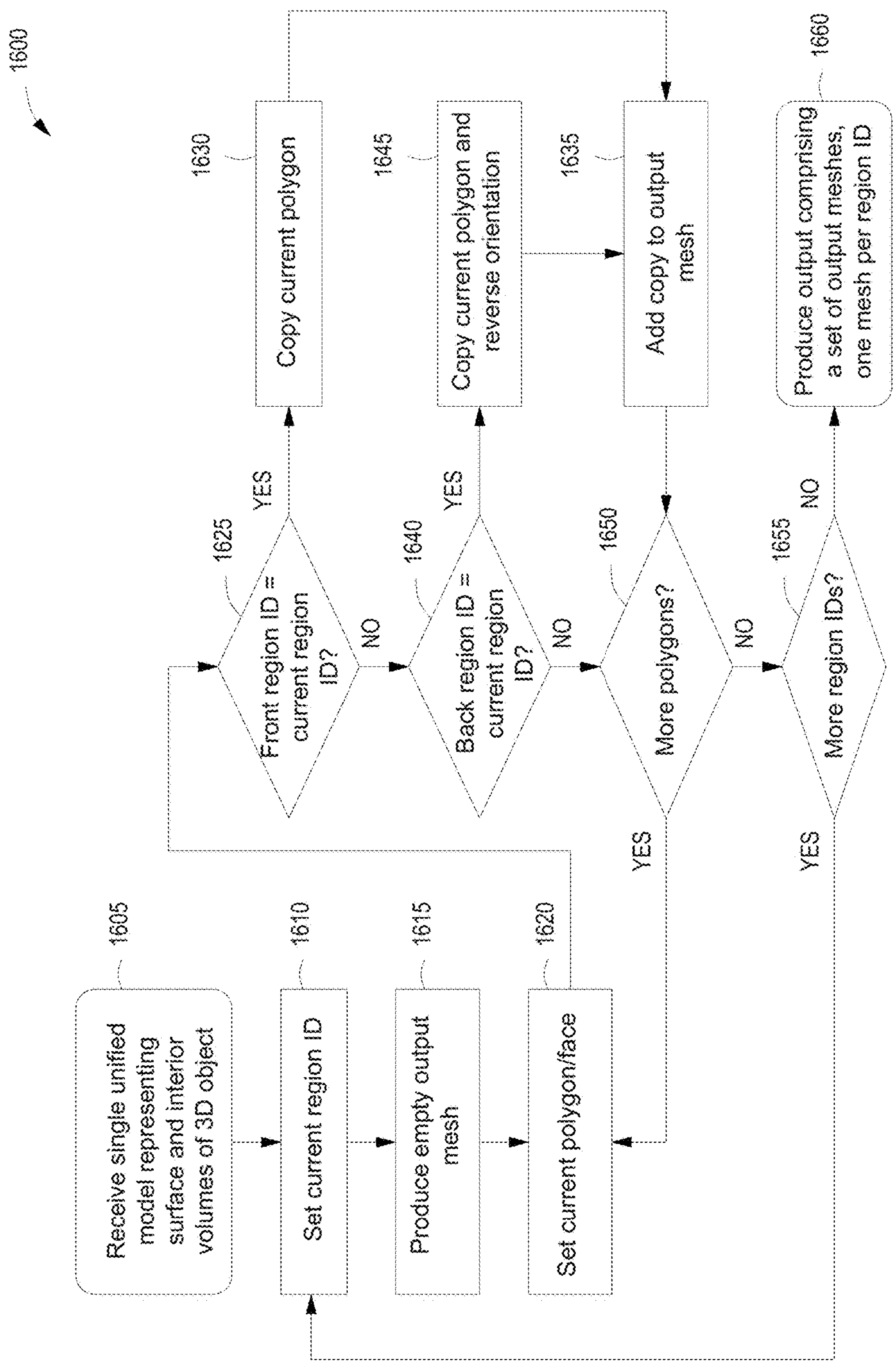
FIG. 16 illustrates a flow diagram of method steps for automatically producing and exporting a printable form of the single unified model, according to one embodiment of the invention.

FIG. 16 illustrates a flow diagram of method steps for automatically producing and exporting a printable form of the single unified model, according to one embodiment of the invention. Although the method steps are described in conjunction with the systems of FIGS. 1-8D and 10-13, persons skilled in the art will understand that any system configured to perform the method steps, in any order, is within the scope of the invention.

To design objects for 3D printers, the export technique of FIG. 16 may describe material properties volumetrically by extracting each contiguous interior volume (bounded by surface regions and interior sheets) of the single unified model 120 to export to 3D printer software. The export technique of FIG. 16 may automatically decompose the single unified model into separate material volumes for sending to a 3D printer.

As shown, a method 1600 begins at step 1605, where the single model engine 115, when executed by processing unit 102, receives a single unified model 120 that represents the surface and interior volumes of a 3D object having at least two different materials. In the method 1600 described in FIG. 16, the single unified model 120 comprises a polygonal mesh, such as a triangular mesh, having a plurality of polygons. Each polygon comprises a “face,” such as a triangle for a triangular mesh. The single unified model 120 comprises distinct surface regions and interior sheets that each comprise a contiguous area of polygons/faces. At step 1605, the single model engine 115 also assigns a unique region identifier (ID) to each distinct surface region and interior sheet of the single unified model 120, whereby the front and back of each polygon/face within the distinct surface region or interior sheet is assigned the region ID. Each unique region ID maps to a particular predetermined material, color, and/or texture. Since the front and back of each polygon/face is assigned a region ID, the material for the front and back of each polygon/face is identifiable.

At step 1610, the single model engine 115 sets a current region surface or interior sheet (having a current region ID) for processing. Through multiple iterations, the method 1600 processes all region surfaces and interior sheets of the single unified model. At step 1615, the single model engine 115 produces an empty output mesh for the current region surface or interior sheet (having the current region ID).

At step 1620, the single model engine 115 sets a current polygon from the single unified model 120 for processing, the current polygon having an assigned front region ID and assigned back region ID. Through multiple iterations, the method 1600 processes all polygons/faces of the single unified model 120.

At step 1625, the single model engine 115 determines whether the front region ID of the current polygon equals the current region ID for the current region surface or interior sheet currently being processed. If not, the method 1600 continues at step 1640. If yes, the single model engine 115 copies the current polygon (at step 1630) and adds the copy of the current polygon to the output mesh for the current region surface or interior sheet and the current region ID (at step 1635). The method 1600 then continues at step 1650.

At step 1640, the single model engine 115 determines whether the back region ID of the current polygon equals the current region ID for the current region surface or interior sheet currently being processed. If not, the method 1600 continues at step 1650. If yes, the single model engine 115 copies the current polygon and reverses the orientation (at step 1645) and adds the copy of the current polygon to the output mesh for the current region surface or interior sheet and the current region ID (at step 1635). The method 1600 then continues at step 1650.

At step 1650, the single model engine 115 determines whether there are more polygons in the single unified model 120 to be processed. If yes, the method 1600 continues at step 1620 where the single model engine 115 sets a next current polygon from the single unified model 120 for processing. If not, the method 1600 continues at step 1655.

At step 1655, the single model engine 115 determines whether there are more surface regions or interior sheets (having a region ID) of the single unified model 120 to be processed. If yes, the method 1600 continues at step 1610 where the single model engine 115 sets a next current region surface or interior sheet (having a current region ID) for processing. If not, the method 1600 continues at step 1660.

At step 1660, the single model engine 115 produces an output comprising a set of output meshes, one mesh being produced for each region ID and region surface or interior sheet of the single unified model 120. The set of output meshes may comprise a printable form of the single unified model 120 that can be received and processed by 3D printer software, and then printed by a 3D printer. The method 1600 then ends.

In sum, a rendering engine 108 may be used to produce a 3D surface model (3D model 110) representing the surface of a 3D real or virtual object. The 3D surface model comprises at least two distinct surface regions (demarcated using different colors and/or textures) associated with at least two different materials for the 3D object, each surface region being associated with a particular corresponding material. The single model engine 115 may receive and process the 3D surface model using a “sheeting” technique to automatically produce a set of interior surfaces (“sheets”) inside the 3D surface model. The sheeting technique may implement a hole filling technique. The set of interior sheets define interior boundaries and interior volumes of the different materials within the 3D surface model. The single model engine 115 then combines the 3D surface model with the set of interior sheets to produce a single unified model 120. The single unified model 120 represents the surface and interior volumes of the 3D object. The 3D object may comprise a single solid object having at least two different materials. The single unified model 120 is also referred to herein as a non-manifold 3D model. At print time, the single model engine 115 may perform an export technique to produce an exportable form of the single unified model 120 that can be received and printed by a 3D printer.

At least one advantage of the disclosed technique is that it automatically produces a single unified model representing a single solid object having multiple materials. The single unified model provides a more intuitive and effective model for designing a multi-material 3D object. Another advantage of the disclosed technique is that the single unified model can be automatically exported in a printable form to be received and printed by a 3D printer.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for modeling a three-dimensional (3D) object, the method comprising:

receiving a 3D surface model representing the surface of the 3D object, the 3D surface model comprising at least two distinct surface regions associated with at least two different materials;

analyzing the at least two distinct surface regions to determine a set of one or more boundary loops;

generating a set of interior sheets for the set of one or more boundary loops, the set of interior sheets defining interior volumes of the at least two different materials within the 3D surface model; and combining the 3D surface model with the set of interior sheets to produce a single unified model representing the surface and interior volumes of the 3D object.

2. The computer-implemented method of claim 1, wherein the 3D object comprises a single solid object having at least two different materials.

3. The computer-implemented method of claim 1, wherein the 3D object comprises a real-world or virtual object.

4. The computer-implemented method of claim 1, wherein the at least two distinct surface regions are demarcated by different color mappings or different texture mappings.

5. The computer-implemented method of claim 1, wherein the set of interior sheets further defines interior boundaries of the different materials within the 3D surface model.

6. The computer-implemented method of claim 1, wherein at least two interior sheets and at least two surface regions define a contiguous interior volume for at least one material.

7. The computer-implemented method of claim 1, wherein the single unified model comprises a non-manifold 3D model.

8. The computer-implemented method of claim 1, further comprising producing a printable form of the single unified model to be received by a 3D printer.

9. The computer-implemented method of claim 8, further comprising receiving, at a 3D printer, the printable form of the single unified model, and printing the 3D object comprising the at least two different materials.

10. A system configured for model a three-dimensional (3D) object, comprising:

a memory that includes a single model engine; and a processor coupled to the memory, wherein, upon executing the single model engine, is configured to:

receive a 3D surface model representing the surface of the 3D object, the 3D surface model comprising at least two distinct surface regions associated with at least two different materials;

analyze the at least two distinct surface regions to determine a set of one or more boundary loops that satisfy a surface region incidence criterion;

generate a set of interior sheets for the set of one or more boundary loops that satisfy the surface region incidence criterion, the set of interior sheets defining interior volumes of the at least two different materials within the 3D surface model; and combine the 3D surface model with the set of interior sheets to produce a single unified model representing the surface and interior volumes of the 3D object.

11. The method of claim 1, wherein analyzing the at least two distinct surface regions to determine the set of one or more boundary loops comprises:

determining a first boundary loop for a first distinct surface region included in the at least two distinct surface regions.

12. The method of claim 11, further comprising determining that the first boundary loop satisfies a surface region incidence criterion, wherein the surface region incidence criterion comprises two surface regions included in the at least two distinct surface regions being incident on the first boundary loop.

13. The method of claim 1, further comprising causing the 3D object comprising the at least two different materials to be printed based on the single unified model.

14. A non-transitory computer-readable medium storing program instructions that, when executed by a processor, cause the processor to model a three-dimensional (3D) object by performing the steps of:

receiving a 3D surface model representing the surface of the 3D object, the 3D surface model comprising at least two distinct surface regions associated with at least two different materials;

analyzing the at least two distinct surface regions to determine a set of one or more boundary loops;

generating a set of interior sheets for the set of one or more boundary loops, the set of interior sheets defining interior volumes of the at least two different materials within the 3D surface model; and combining the 3D surface model with the set of interior sheets to produce a single unified model representing the surface and interior volumes of the 3D object.

15. The non-transitory computer-readable medium of claim 14, wherein the 3D object comprises a single solid object having at least two different materials.

16. The non-transitory computer-readable medium of claim 14, wherein the 3D object comprises a real-world or virtual object.

17. The non-transitory computer-readable medium of claim 14, wherein the at least two distinct surface regions are demarcated by different colors or textures, each color or texture mapping to a particular type of material.

18. The non-transitory computer-readable medium of claim 14, wherein the set of interior sheets and surface regions define contiguous interior volumes for the at least two different materials.

19. The non-transitory computer-readable medium of claim 14, wherein at least two interior sheets and at least two surface regions define a contiguous interior volume for at least one material.

20. The non-transitory computer-readable medium of claim 14, wherein generating the set of interior sheets comprises implementing a hole filling technique for generating each interior sheet.

21. The non-transitory computer-readable medium of claim 14, further comprising producing a printable form of the single unified model to be received by a 3D printer.

22. The non-transitory computer-readable medium of claim 14, wherein the 3D surface model and single unified model comprise a polygonal mesh.

23. The system of claim 10, wherein the 3D object comprises a real-world or virtual object comprising a single solid object having at least two different materials.

* * * * *